(12) United States Patent  
Frey et al.

(10) Patent No.: US 8,171,170 B2  
(45) Date of Patent: May 1, 2012

(54) STORAGE SWITCH TASK PROCESSING SYNCHRONIZATION

(75) Inventors: Robert Tower Frey, Milpitas, CA (US); Chao Zhang, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 1819 days.

(21) Appl. No.: 10/836,104

(22) Filed: Apr. 30, 2004

(65) Prior Publication Data

US 2006/0036769 A1    Feb. 16, 2006

(51) Int. Cl.
*G06F 15/16* (2006.01)
(52) U.S. Cl. ...................................................... 709/248
(58) Field of Classification Search .................... 709/248
See application file for complete search history.

(56) References Cited

U.S. PATENT DOCUMENTS

| 6,449,291 B1 * | 9/2002 | Burns et al. .................. 370/516 |
| 2003/0093567 A1 * | 5/2003 | Lolayekar et al. ............ 709/246 |
| 2005/0038984 A1 * | 2/2005 | Heidari-Bateni et al. ........ 713/1 |

* cited by examiner

*Primary Examiner* — Hussein Elchanti  
*Assistant Examiner* — Maceeh Anwari  
(74) *Attorney, Agent, or Firm* — Barry N. Young

(57) ABSTRACT

Systems and methods in accordance with various embodiments relate to a storage switch including task processing synchronization. In embodiments of the present invention, the packet processing units may generate and store Task Index and Generation Count information that prevents the processing of expired commands or responses. Additionally or alternatively, embodiments of the present invention may further employ timeout sequences to prevent previous instances of a stale task resource from disrupting the current use of the task resource.

31 Claims, 16 Drawing Sheets

(Virtualization Ingress - cmd)

(Virtualization - Egress - cmd)

(Virtualization - Ingress - R2T/XFR_RDY)

(Virtualization - Egress - R2T/XFR_RDY)

(Virtualization - Ingress - write data packet)

(Virtualization - Egress - write data pkt)

(Virtualization - Ingress -
Read Data pkt)

(Virtualization - Egress- Read Data pkt)

(Virtualization - Ingress - response pkt)

(Virtualization - Egress - response pkt)

(Task Synchronization)

(Task Synchronization)

STORAGE SWITCH TASK PROCESSING SYNCHRONIZATION

CROSS-REFERENCE TO RELATED APPLICATIONS

The following applications are cross-referenced and incorporated by reference herein in their entirety:

U.S. patent application Ser. No. 10/051,321, entitled STORAGE SWITCH FOR STORAGE AREA NETWORK, filed Jan. 18, 2002, now U.S. Pat. No. 7,707,304, issued Apr. 27, 2010;

U.S. patent application Ser. No. 10/051,415, entitled PROTOCOL TRANSLATION IN A STORAGE SYSTEM, filed Jan. 18, 2002, now U.S. Pat. No. 7,404,000, issued Jul. 28, 2008;

U.S. patent application Ser. No. 10/051,164, entitled SERVERLESS STORAGE DEVICES, filed Jan. 18, 2002, now U.S. Pat. No. 7,185,062, issued Feb. 27, 2009;

U.S. patent application Ser. No. 10/051,093, entitled PACKET CLASSIFICATION IN A STORAGE SYSTEM, filed Jan. 18, 2002, now U.S. Pat. No. 7,558,264, issued Jul. 7, 2009;

U.S. patent application Ser. No. 10/051,396, entitled VIRTUALIZATION IN A STORAGE SYSTEM, filed Jan. 18, 2002, now U.S. Pat. No. 7,864,758, issued Jan. 4, 2011;

U.S. patent application Ser. No. 10/051,339, entitled ENFORCING QUALITY OF SERVICE IN A STORAGE NETWORK, filed Jan. 18, 2002, now U.S. Pat. No. 7,421,509, issued Sep. 2, 2008;

U.S. patent application Ser. No. 10/050,974, entitled POOLING AND PROVISIONING STORAGE RESOURCES IN A STORAGE NETWORK, filed Jan. 18, 2002, now U.S. Pat. No. 6,979,134, issued Dec. 13, 2005; and U.S. patent application Ser. No. 10/051,053, entitled LOAD BALANCING IN A STORAGE NETWORK, filed Jan. 18, 2002, now abandoned.

BACKGROUND OF THE INVENTION

1. Field of the Invention

The present invention relates generally to storage area networks, and in particular to a system for synchronizing task processing.

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SANs has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can include servers, personal computing devices, and other devices capable of providing write commands and requests, are generally interconnected via various switches and/or appliances. The connections to the switches and appliances are usually Fibre Channel. This structure generally allows for any initiator on the SAN to communicate with any target and vice versa. It also provides alternative paths from initiator to target. In other words, if a particular initiator is slow or completely unavailable, another initiator on the SAN can provide access to the target. A SAN also makes it possible to mirror data, making multiple copies available and thus creating more reliability in the availability of data. When more storage is needed, additional storage devices can be added to the SAN without the need to be connected to a specific initiator, rather, the new devices can simply be added to the storage network and can be accessed from any point.

Some SANs utilize appliances to perform storage management for the SAN. A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s).

An example of a SAN is shown in the system 100 illustrated in the functional block diagram of FIG. 1. As shown, there are one or more servers 102. Three servers 102 are shown for exemplary purposes only. Servers 102 are connected through an Ethernet connection to a LAN 106 and/or to a router 108 and then to a WAN 110, such as the Internet. In addition, each server 102 is connected through a Fibre Channel connection to each of a plurality of Fibre Channel switches 112 sometimes referred to as the "fabric" of the SAN. Two switches 112 are shown for exemplary purposes only. Each switch 112 is in turn connected to each of a plurality of SAN appliances 114. Two appliances 114 are shown for exemplary purposes only. Each appliance is also coupled to each of a plurality of storage devices 116, such as tape drives, optical drives, or RAID arrays. In addition, each switch 112 and appliance 114 is coupled to a gateway 118, which in turn is coupled to router 108, which ultimately connects to a Wide Area Network (WAN) 118, such as the Internet. FIG. 1 shows one example of a possible configuration of a SAN 119, which includes switches 112, appliances 114, storage devices 116, and gateways 118. Still other configurations are possible. For instance, one appliance may be connected to fewer than all the switches.

SANs, typically through switches and/or appliances, perform virtualization functions to allocate space of one or more physical targets to a particular user with the physical space remaining unknown to the user. For example, a company may utilize a SAN to provide data storage that employees access for data storage and retrieval. An engineering department, for example, may have storage allocated as "engineering storage space." The employees may see and interact with the virtual space as they would see or interact with a physical storage device such as an attached hard disk drive. Nevertheless, the space may actually be divided over multiple physical storage devices and even be fragmented within single storage devices. A switch or appliance can receive a request for a virtual space and block number(s) and determine the device(s) and portions thereof that physically correlate to the virtual space requested in order to direct the data accordingly.

In general, SANs are formed using a single protocol to interconnect the devices. Although Fibre Channel is the most commonly used, Ethernet connections have also been used. Nonetheless, if both protocols are desired to be used, some kind of transition between the two protocols must occur. In such instances, a Fibre Channel SAN 119 is typically coupled to an Ethernet SAN 122 via a bridge 121. To transition from one protocol to the other, a packet is received by the bridge and stored in memory. Once the packet is stored in a memory, a processor operates on the packet to remove the headers of one protocol and build the headers of the other protocol, thereby constructing an entirely new packet.

While appliances can perform switching operations, switches are often used to connect initiators with appliances, given the large number of initiators and small number of ports included in many appliances. In more current SAN implementations, switches have replaced certain functionality previously preformed by appliances such that appliances are not necessary and can be eliminated from the systems.

More recent storage area network switches are capable of routing data between initiators and targets without buffering the data as required by earlier appliances used in SANs. For example, some storage switches can route data packets without introducing more latency to the packets than would be introduced by a typical network switch. Such unbuffered data transfer between initiators and targets must be handled reliably and efficiently by the switch performing the interconnection. An example of a storage switch can be found in U.S. Pat. No. 7,864,758, entitled VIRTUALIZATION IN A STORAGE SYSTEM, filed Jan. 18, 2002, previously incorporated herein by reference.

As disclosed in U.S. Pat. No. 7,864,758, a storage switch may include one or more line cards for establishing connections to the servers and storage devices. Each line card may include Packet Processing Units (PPUs) for performing virtualization and protocol transmission on the fly (i.e., no buffering). Each line card may include an ingress PPU for receiving data packets into the switch, and an egress PPU for sending data packets out from the switch.

It is essential that the ingress PPU and the egress PPU remain in synchronization with each other. For example, when the initiator (e.g., the server) sends a task, such as a request to write data to the storage device, this request is received by the ingress PPU, which in turn forwards the request to a line card traffic manager. If the storage device is ready to receive the request, the storage device sends a transfer ready response to the egress PPU via the line card traffic manager, and the egress PPU in turn forwards the response back to the initiator to send the data. It is important that the transfer ready response generated by the egress PPU is for the specific request generated by the ingress PPU. Otherwise the request will not complete successfully.

However, it may happen that a task is forwarded by the ingress PPU and for a variety of reasons the transfer ready response for that task is not received back from the egress PPU. In such an instance, the PPU will timeout while waiting for the response. For example, the storage device may be unavailable. In such an instance, the system may become deadlocked waiting for the response. Alternatively, if and when the egress PPU does generate the transfer ready response, the ingress PPU may have received a new request, and there is no guarantee that the response from the egress PPU is synchronized to the request from the ingress PPU. There is not a reliable messaging mechanism between the ingress PPU and the egress PPU. Additionally because there is not a reliable messaging mechanism between the ingress PPU and the egress PPU, the PPUs must be capable of recovering from any request and response loss whether it is caused by a storage switch internal or external error.

Both the ingress PPUs and egress PPUs have memories, such as for example a static random access memory (SRAM). However, the ingress and egress PPU memories cannot be shared, as it is imperative for performance that both the ingress and egress PPUs execute separately and independently of each other. Nor is it conceivable to use a hardware interlock mechanism in the storage switch to maintain synchronization, as this would result in performance loss and increased logic space. While it may further be possible to provide a buffered implementation provide reliable messaging, again, this will adversely affect system performance.

SUMMARY OF THE INVENTION

It is therefore an advantage of the present invention to provide a system for ensuring reliable messaging and synchronization between the ingress packet processing unit and egress packet processing unit in a storage switch of a storage area network.

It is another advantage of the present invention to provide a mechanism for preventing a dropped or lost data packet from disrupting the current use of task resources.

These and other advantages are provided by the present invention which in embodiments, relates to a storage switch including task processing synchronization. In embodiments of the present invention, the packet processing units (PPUs) of an ingress port and one or more egress ports are kept consistent and in synchronization with each other using a comparison of index and generation count markers. The index and generation counts are maintained in the ingress task control block (ITCB) and egress task control block (ETCB) associated with a particular request and its associated response. In particular, upon receiving a command and allocating an ITCB, the ingress PPU allocates a Task Index uniquely identifying the ITCB, and a Generation Count uniquely identifying the command being processed by that ITCB.

This information is passed to the ETCB in the local headers of the packet forwarded to the ETCB. If a response is properly and timely received, the Task Index and the Generation Count of the returned frame will match that stored in the ITCB of the ingress PPU. However, if time passes without receiving the response, an ITCB may be freed to accept a new command. In this instance, the Generation Count is incremented. Thus, if a response is eventually received back in the ingress PPU, the Generation Count of the appropriate ITCB will not match the received frame. In this instance, the response is discarded, resources that have been allocated for the response are freed, and a message may be sent to the initiator indicating the error so that the initiator may initiate the command again.

The ITCB generation count is first passed in a frame header from ITCB to ETCB. Then ETCB stores this ITCB generation count in ETCB. When subsequent frames come from ITCB to ETCB, ETCB will match the generation count in the frame header and the generation count in ETCB. If they do not match, the frame is dropped. This prevents multiple logical ETCB with different generation counts on a single physical ETCB from being linked to the same ITCB. In the other direction, when ITCB receives a frame from ETCB, it need not do generation count matching. This is because the ITCB has a longer timeout than ETCB. This means that ITCB will always live longer than ETCB. Therefore, it is impossible that multiple logical ITCB with different generation counts on a single physical ITCB are accessed by the same ETCB.

It may happen that one or more of the inter-PPU request/ responses are never received from the PPUs for the ports that received a request. Therefore, in addition or as an alternative to the task synchronization steps described above, embodiments of the present invention may further employ timeouts to prevent previous instances of a stale task resource from disrupting the current use of the task resource.

In accordance with one embodiment of the timeout sequence, timeout countdowns may be implemented independently in the PPUs associated with the ingress and egress ports. The storage switch can check the status of the commands provided to and returned from the physical targets via the ingress PPU and egress PPU to determine if all the appropriate responses have been returned within a predetermined amount of time after issuing the commands. If the egress PPU timer times out, or the ingress PPU timer times out, then an abort command may be sent to abort the pending request, allocated resources may be freed, and an error message may be sent to the initiator so that a command may be sent again.

Various timeout periods at the ingress and egress PPUs may be appropriate and used in individual implementations depending upon various design considerations. In embodiments of the present invention, the timeout period of the egress PPU is preferably less than the timeout period of the ingress PPU to prevent the ingress PPU from prematurely aborting a command before the egress PPU has time to generate the response. Additionally, in embodiments of the present invention, both the egress and ingress PPU timeout periods are less than the timeout period for the initiator. Initiator timeouts take longer to resolve and it is preferable that timeouts be handled by the PPUs. If a PPU associated with an ingress or egress port timely receives either a command, a response, a frame or a data packet, then the PPU timer is reset.

DETAILED DESCRIPTION

The present invention will now be described with reference to FIGS. 2-16, which in embodiments relates to a storage switch including task processing synchronization. It is understood that the present invention may be embodied in many different forms and should not be construed as being limited to the embodiments set forth herein. Rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
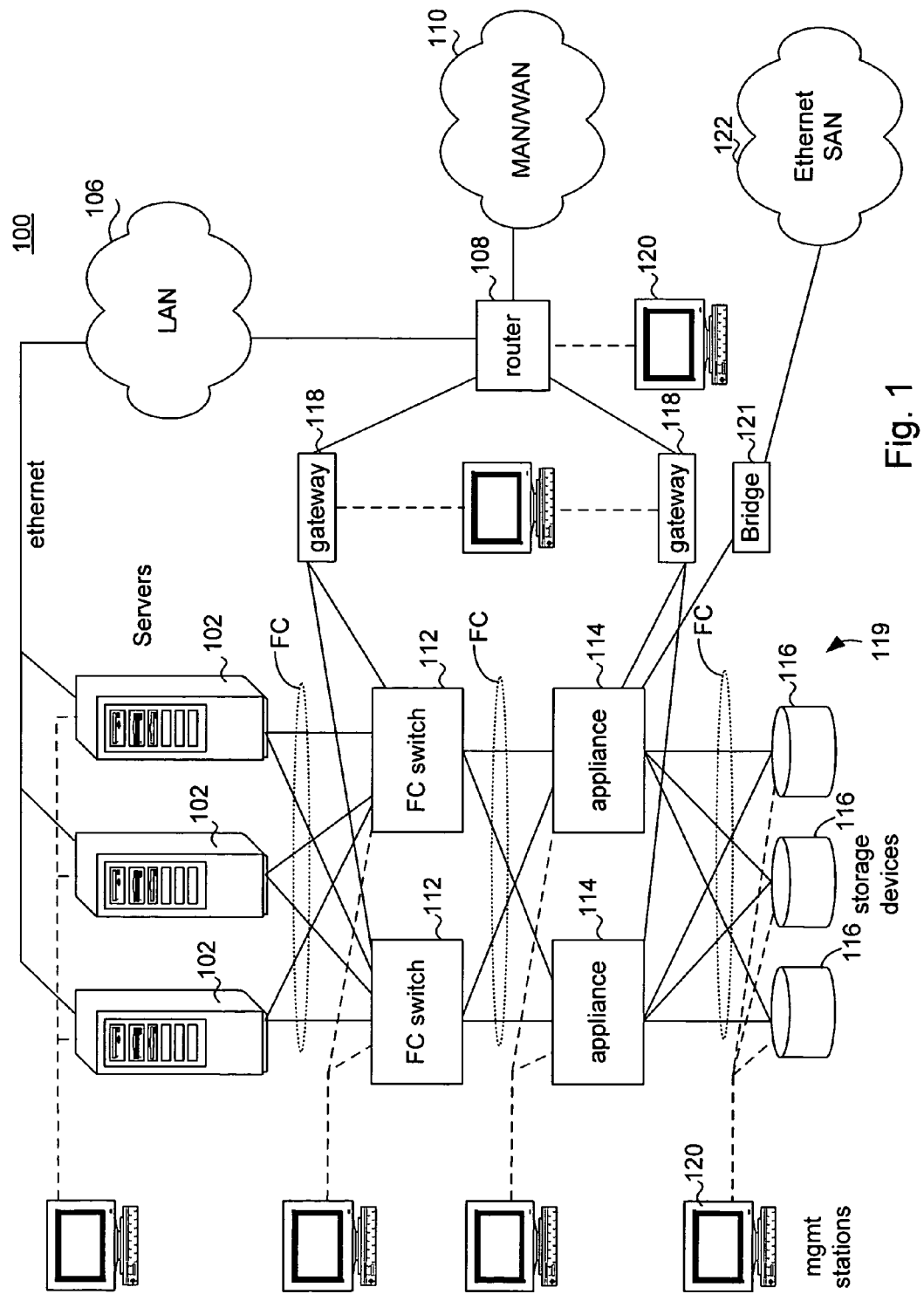
FIG. 1 is a prior art functional block diagram of a conventional SAN.
Figure 2:
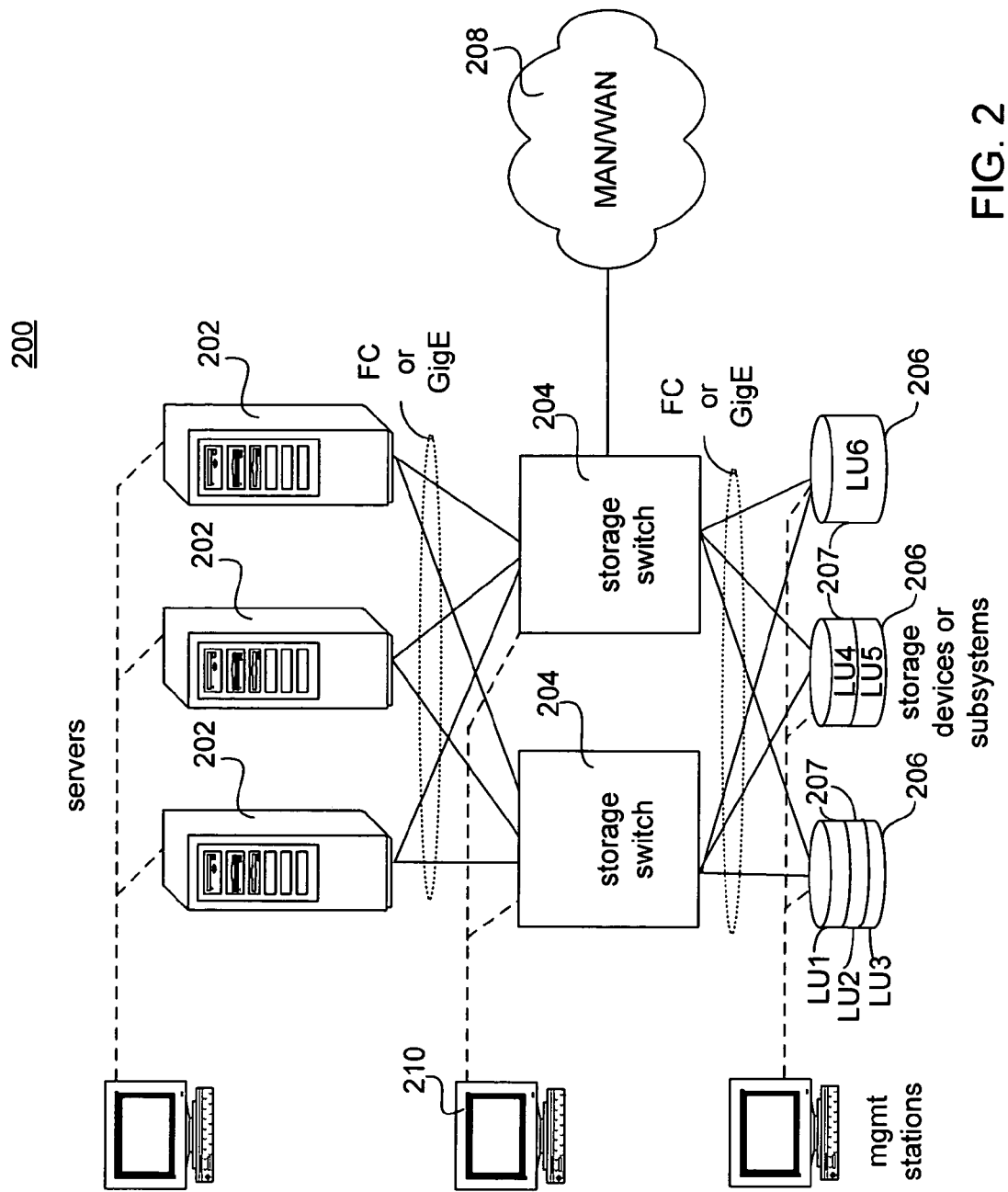
FIG. 2 is a generalized functional block diagram of a SAN having a storage switch in accordance with one embodiment of the present invention.

An exemplary system 200 including a storage switch in accordance with one embodiment of the present invention is illustrated in FIG. 2. System 200 can include a plurality of initiating devices such as servers 202. It will be appreciated that more or fewer servers can be used and that embodiments can include any suitable physical initiator in addition to or in place of servers 202. Although not shown, the servers could also be coupled to a LAN. As shown, each server 202 is connected to a storage switch 204. In other embodiments, however, each server 202 may be connected to fewer than all of the storage switches 204 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by Intel Inc., or other protocols or connections.

In embodiments, one or more switches 204 are each coupled to a Metropolitan Area Network (MAN) or Wide Area Network (WAN) 208, such as the Internet. The connection formed between a storage switch 204 and a WAN 208 will generally use the Internet Protocol (IP) in most embodiments. Although shown as directly connected to MAN/WAN 208, other embodiments may utilize a router (not shown) as an intermediary between switch 204 and MAN/WAN 208.

In addition, respective management stations 210 are connected to each storage switch 204, to each server 202, and to each storage device 206. Although management stations are illustrated as distinct computers, it is to be understood that the software to manage each type of device could collectively be on a single computer.

The switch 204, in addition to its switching function, can provide virtualization and storage services (e.g., mirroring, mirroring over a slow link, snapshot, virtual target cloning (replication), third party copy, periodic snapshot and backup, and restore). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 204 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks including that as illustrated in FIG. 2 can be found in U.S. Pat. No. 7,707,304, entitled STORAGE SWITCH FOR STORAGE AREA NETWORK, and U.S. Pat. No. 7,864,758, entitled VIRTUALIZATION IN A STORAGE SYSTEM, previously incorporated herein by reference.

"Virtualization" generally refers to the mapping of a virtual target space subscribed to by a user to a space on one or more physical storage target devices. The terms "virtual" and "virtual target" come from the fact that storage space allocated per subscription can be anywhere on one or more physical storage target devices connecting to a storage switch 204. The physical space can be provisioned as a "virtual target" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 3:
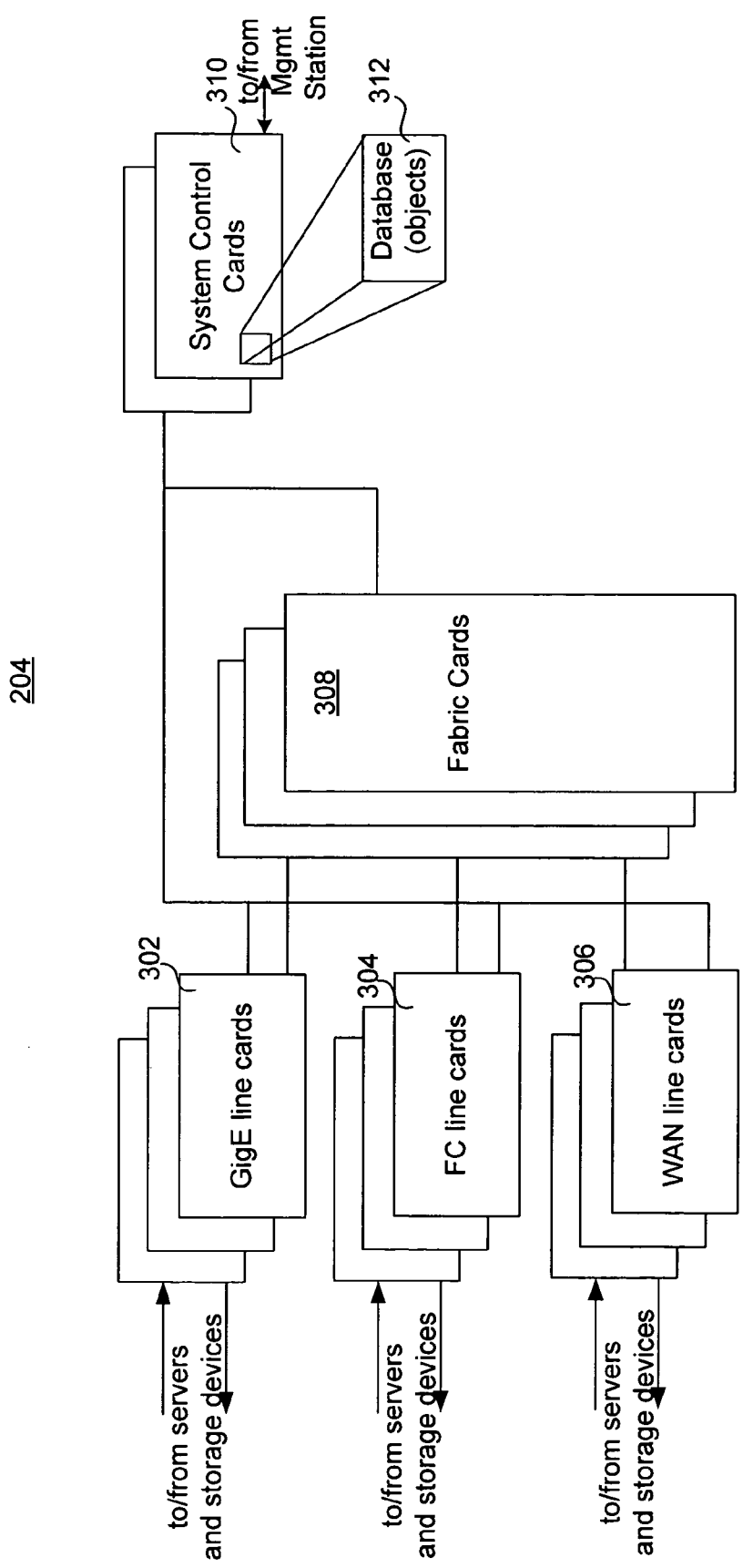
FIG. 3 is a generalized functional block diagram of a storage switch in accordance with one embodiment.

FIG. 3 illustrates a functional block diagram of a storage switch 204 in accordance with an embodiment of the invention. More information regarding the details of a storage switch including many of the elements of storage switch 204 and its operation can be found in U.S. Pat. No. 7,707,304 entitled STORAGE SWITCH FOR STORAGE AREA NETWORK, previously incorporated by reference. In one embodiment, the storage switch 204 includes a plurality of linecards 302, 304, and 306, a plurality of fabric cards 308, and two system control cards 310, each of which will be described in further detail below. Although an exemplary storage switch is illustrated, it will be appreciated that numerous other implementations and configurations can be used in accordance with various embodiments.

System Control Cards. Each of the two System Control Cards (SCCs) 310 connects to every line card 302, 304, 306. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the Ethernet connections, the SCC also initiates various storage services, e.g., snapshot and replicate.

In addition, the SCC maintains a database 312 that tracks configuration information for the storage switch as well as all virtual targets and physical devices attached to the switch, e.g., servers and storage devices. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 204 can be reached by a management station 110 through the SCC 310 using an Ethernet connection. Accordingly, the SCC also includes an additional Ethernet port for connection to a management station. An administrator at the management station can discover the addition or removal of storage devices or virtual targets, as well as query and update virtually any object stored in the SCC database 312.

Fabric Cards. In one embodiment of switch 204, there are three fabric cards 308, although other embodiments could have more or fewer fabric cards. Each fabric card 308 is coupled to each of the linecards 302, 304, 306 in one embodiment and serves to connect all of the linecards together. In one embodiment, the fabric cards 308 can each handle maximum traffic when all linecards are populated. Such traffic loads handled by each linecard are up to 160 Gbps in one embodiment although other embodiments could handle higher or lower maximum traffic volumes. If one fabric card 308 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 204 supports up to sixteen linecards although other embodiments could support a different number. Further, in one embodiment, three different types of linecards are utilized: Gigabit Ethernet (GigE) cards 302, Fibre Channel (FC) cards 304, and WAN cards 306. Other embodiments may include more or fewer types of linecards. The GigE cards 302 are for Ethernet connections, connecting in one embodiment to either iSCSI servers or iSCSI storage devices (or other Ethernet based devices). The FC cards 304 are for Fibre Channel connections, connecting to either Fibre Channel Protocol (FCP) servers or FCP storage devices. The WAN cards 306 are for connecting to a MAN or WAN.

Figure 4:
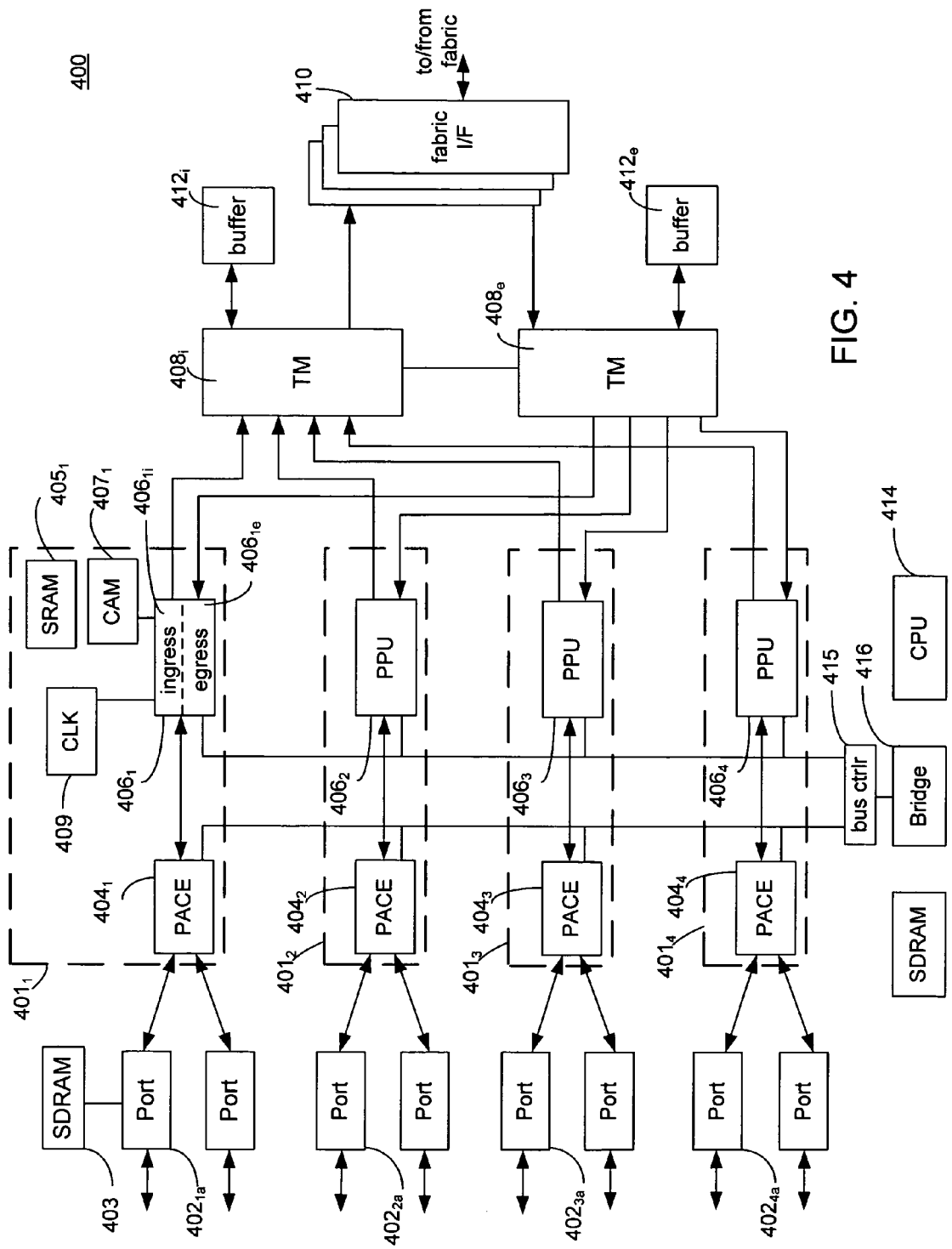
FIG. 4 is a generalized functional block diagram of a linecard used in a storage switch in accordance with one embodiment.

FIG. 4 illustrates a functional block diagram of a generic line card 400 used in a storage switch 204 in accordance with one embodiment. Line card 400 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 400 includes a plurality of ports 402. The ports form the linecards' connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 204. The ports of each linecard are full duplex in one embodiment, and connect to either a server or other client, or to a storage device or subsystem.

In addition, each port 402 has an associated memory 403. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 401. In one embodiment the SPU rapidly processes the data traffic allowing for wire-speed operations. In one embodiment, each SPU includes several elements: a Packet Aggregation and Classification Engine (PACE) 404, a Packet Processing Unit (PPU) 406, an SRAM 405, a CAM 407 and clock (CLK) 409. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 404. As illustrated, the PACE 404 aggregates two ports into a single data channel having twice the bandwidth. For instance, the PACE 404 aggregates two 1 Gb ports into a single 2 Gb data channel. The PACE can classify each received packet into a control packet or a data packet. Control packets are sent to the CPU 414 for processing, via bridge 416. Data packets are sent to a Packet Processing Unit (PPU) 406, discussed below, with a local header added. In one embodiment the local header is sixteen bytes resulting in a data "cell" of 64 bytes (16 bytes of header and 48 bytes of payload). The local header is used to carry information and used internally by switch 204. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU 406$_1$, while all four PACEs in the illustrated embodiment share a path to the CPU 414, which in one embodiment is a 104 MHz/32 (3.2 Gbps) bit data path.

Packet Processing Unit (PPU). Each PPU such as PPU 406, performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU 406$_{1i}$ and an egress PPU 406$_{1e}$, which both run concurrently. The ingress PPU 406$_{1i}$ receives incoming data from PACE 404$_1$ and sends data to the Traffic Manager 408$_i$ while the egress PPU 406$_{1e}$ receives data from Traffic Manager 408$_e$ and sends data to a PACE 404$_1$. Although only one PPU 406$_1$ is shown in FIG. 4 as having an ingress PPU 406$_{1i}$ and an egress PPU 406$_{1e}$, it is to be understood that in one embodiment all PPUs 406 will include both an ingress and an egress PPU and that only one PPU is shown in FIG. 4 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 414 of the linecard 400 informs a PPU 406 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU 406$_1$ are connected to an SRAM 405$_1$ and CAM 407$_1$. SRAM 405$_1$ can store a VTD and PTD database. A listing of VTD Identifiers (VTD IDs), or addresses, as well as PTD Identifiers (PTD IDs), is also maintained in the PPU CAM 407$_1$ for quick accessing of the VTDs. The VTD IDs are indexed (mapped) using a TCP Control Block Index and a LUN. The PTD IDs are indexed using a VTD ID. In addition, for IP routing services, the CAM 407$_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 407 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes. The task synchronization features of the task control blocks according to the present invention are explained hereinafter.

Traffic Manager. There are two traffic managers (TMs) 408 on each linecard 400: one TM 408$_i$ for ingress traffic and one TM 408$_e$ for egress traffic. The ingress TM receives cells from all four SPUs, in the form of 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 410 in one embodiment. Other embodiments may operate at 125 Mhz or other speeds. The egress TM receives the data cells from the fabric cards and delivers them to the four SPUs.

Both ingress and egress TMs have a large buffer 412 to queue cells for delivery. Both buffers 412 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function, discussed further below, used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 410 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 410.

CPU. On every linecard there is a processor (CPU) 614, which in one embodiment is a PowerPC 750 Cxe. In one embodiment, CPU 414 connects to each PACE with a 3.2 Gb bus, via a bus controller 415 and a bridge 416. In addition, CPU 414 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 204 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 414 and the SCC 310 are involved. When a TCP packet is received, and after initial handshaking is performed, a TCP control block is created and stored in the GigE port memory 403. A VTD is also retrieved from an object of the SCC database and stored in the CPU SDRAM 405 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 405. The CPU creates the VTD by retrieving the VTD information stored in its SDRAM and originally obtained from the SCC database. A VTD ID is established in a list of VTD IDs in the SPU CAM 407 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 402 communicates with the PACE 404 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELS's to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 4; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ietf-ips-iSCSl-09.txt," an Internet Draft and work in progress by the Internet Engineering Task Force (IETF), Nov. 19, 2001, incorporated by reference herein. For more information about Fibre Channel (FC) refer to "Information Systems—dpANS Fibre Channel Protocol for SCSI," Rev. 012, Dec. 4, 1995 (draft proposed American National Standard), incorporated by reference herein. In addition, both are further described in U.S. Pat. No. 7,707,304, entitled STORAGE SWITCH FOR STORAGE AREA NETWORK, previously incorporated by reference.

Virtualization

Exemplary ingress and egress processes for various packet types are described for explanatory purposes only. It will be understood that numerous processes for various packet types can be used in accordance with various embodiments. In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

Figure 5:
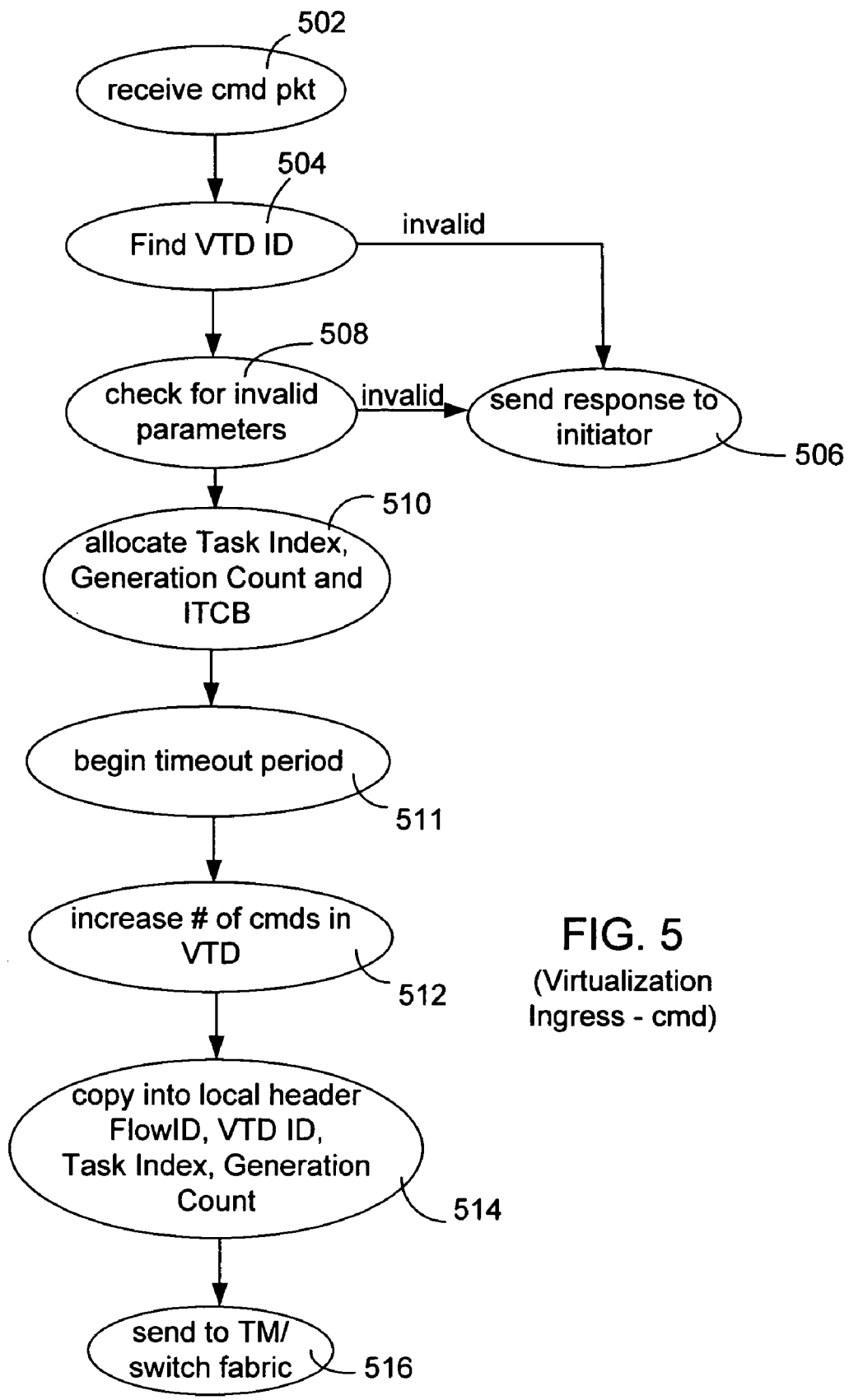
FIG. 5 is a is a flowchart illustrating a virtualization process in the ingress direction for command packets or frames, in accordance with one embodiment.

To initiate a transfer task to or from the virtual target, a SCSI command is sent by an iSCSI or FC initiator in an iSCSI PDU or FCP IU, respectively. Referring to FIG. 5, when such a packet is received at the PPU (after classification), step 502, the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator, step 504. The LUNs in each case are found in the respective iSCSI PDU or FCP IU. If no valid VTD ID is found, then a response packet is sent back to the initiator, step 506. If a valid VTD is found, then a check is made for invalid parameters, step 508. If invalid parameters exists, a response packet is sent back to the iSCSI or FC initiator, step 506.

A Task Index and Generation Count (explained hereinafter) are allocated along with an Ingress Task Control Block (ITCB), step 510. The Task Index and Generation Count may be stored as fields within the ITCB. In embodiments of the invention, a timeout countdown period may also be initiated, step 511 (explained hereinafter). The Task Index points to or identifies the ITCB. The ITCB stores the FlowID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands, step 512. In some embodiments, VTDs establish a maximum number of commands that may be outstanding to any one particular virtual target. The FlowID, the VTD ID, the Task Index and the Generation Count are all copied into the local header, step 514. The FlowID tells the traffic manager the destination linecards and ports. Later, the Task Index and the Generation Count will be returned by the egress port to identify a particular task of a packet, as explained in greater detail below. Finally, the packet is sent to the traffic manager and then the routing fabric, so that it ultimately reaches an egress PPU, step 516.

When a virtual target is composed of multiple extents, there are multiple FlowIDs identified in the VTD, one for each extent. The PPU checks the block address for the packet and selects the correct FlowID. For example, if a virtual target has two 1 Gb extents, and the block address for the command is in the second extent, then the PPU selects the FlowID for the second extent. In other words, the FlowID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Command Packet—Egress

Figure 6:
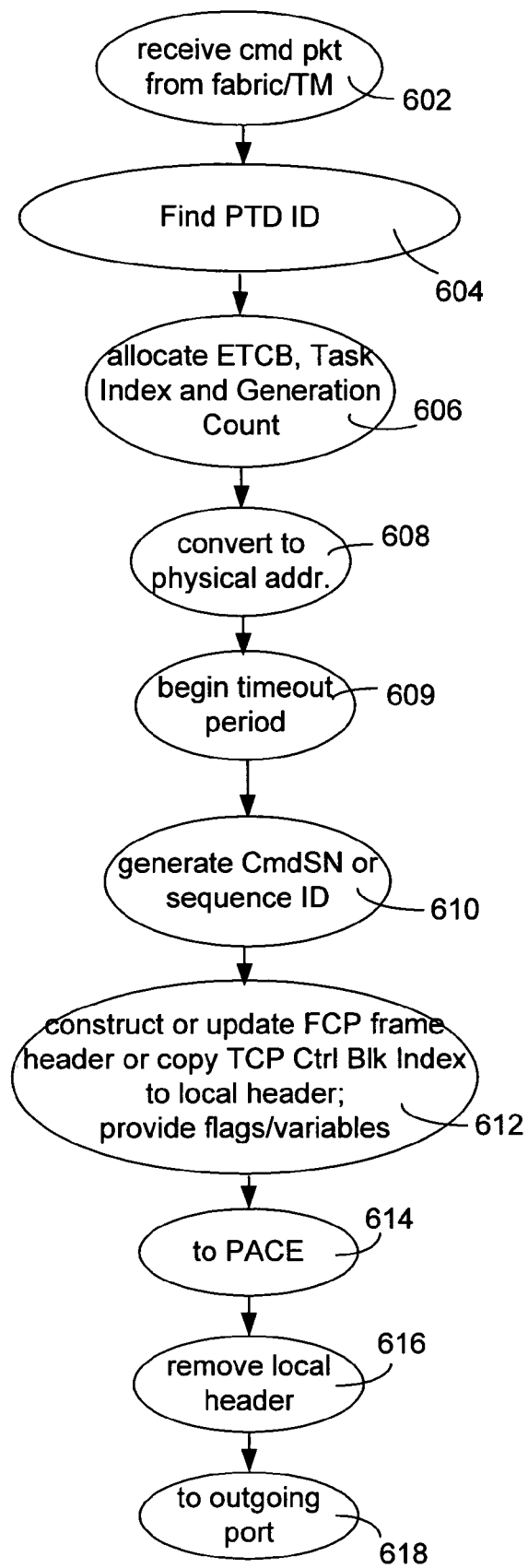
FIG. 6 is a flowchart illustrating a virtualization process in the egress direction for command packets or frames, in accordance with one embodiment.

Referring to FIG. 6, after a command PDU or IU has passed through the switch fabric, it will arrive at a PPU, destined for an egress port, step 602. The PPU attempts to identify the physical device(s) that the packet is destined for, step 604. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the FlowID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 606. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU. The ETCB also stores the Generation Count.

Using the contents of the PTD, the PPU converts the SCSI block address from a virtual target to the block address of a physical device, step 608. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. In embodiments of the invention, the PPU may then initiate a timeout countdown period, step 609, as explained hereinafter. Next the PPU generates proper iSCSI CmdSN or FCP sequence ID, step 610 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 612. In addition, the PPU provides any flags or other variables needed for the iSCSI or FCP headers. The completed iSCSI PDU or FCP frame are then sent to the PACE, step 614, which in turn strips the local header, step 616, and passes the packet to appropriate port, step 618.

R2T or XFER_RDY—Ingress

Once a request is made on a physical target to write data, the physical targets responds with a transfer ready signal to the initiating device to indicate their availability to receive data. For example, devices using a fibre channel protocol typically issue XFER_RDY frames to initiating devices in response to write commands to indicate the target's availability to receive data. Similarly, devices using the iSCSI protocol typically issue R2T frames to initiating devices to indicate availability. For clarity of discussion, reference may be made herein to only XFER_RDY or R2T signals while discussing exemplary embodiments. It will be understood, however, that the invention is not limited to any given signal, protocol, or type of transfer ready resource. Embodiments in accordance with the present invention may be applicable to any protocol or type of indication a target may issue to indicate an ability or readiness to receive data.

Figure 7:
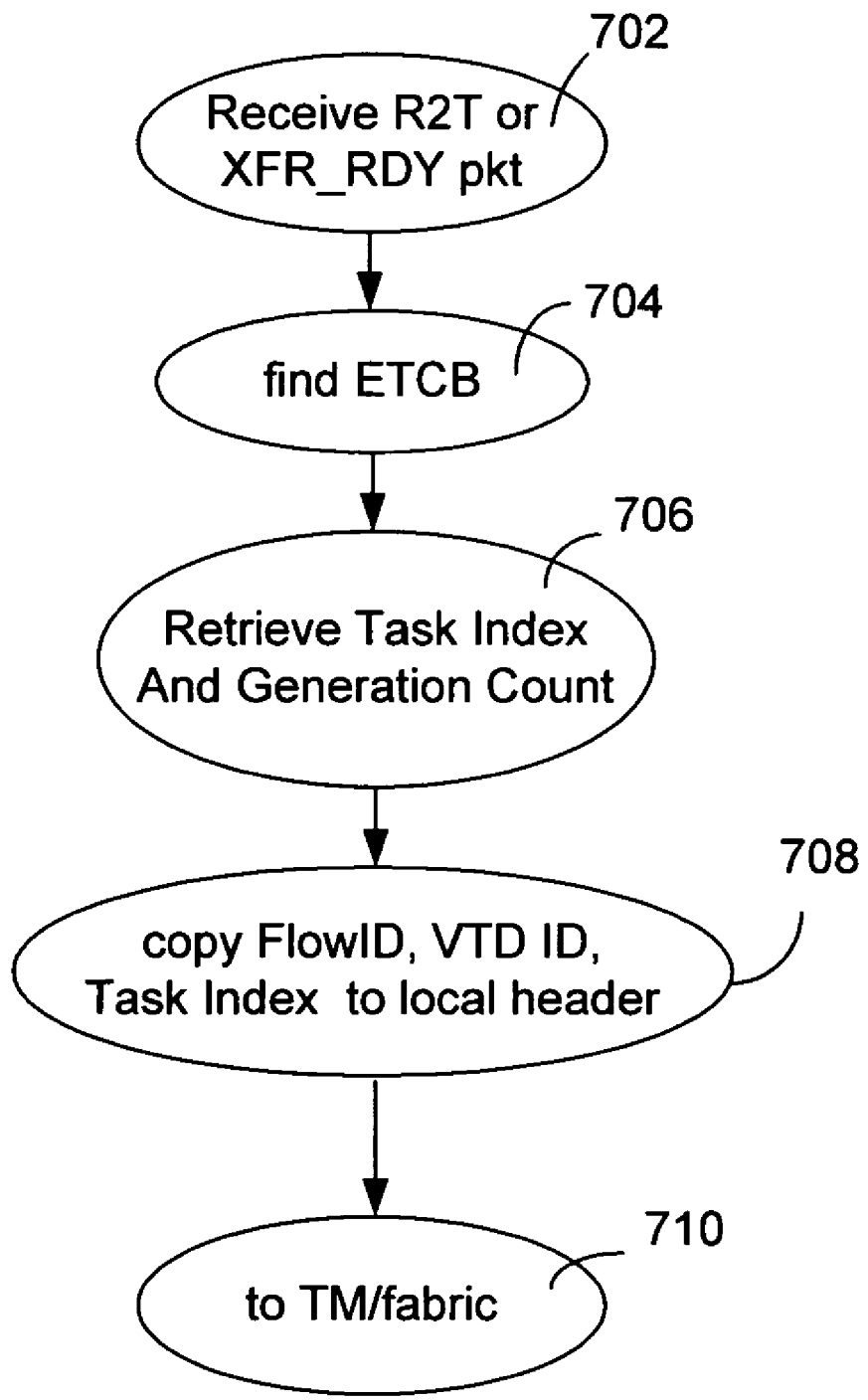
FIG. 7 is a flowchart illustrating a virtualization process in the ingress direction for R2T or XFER_RDY packets or frames, in accordance with one embodiment.
Figure 8:
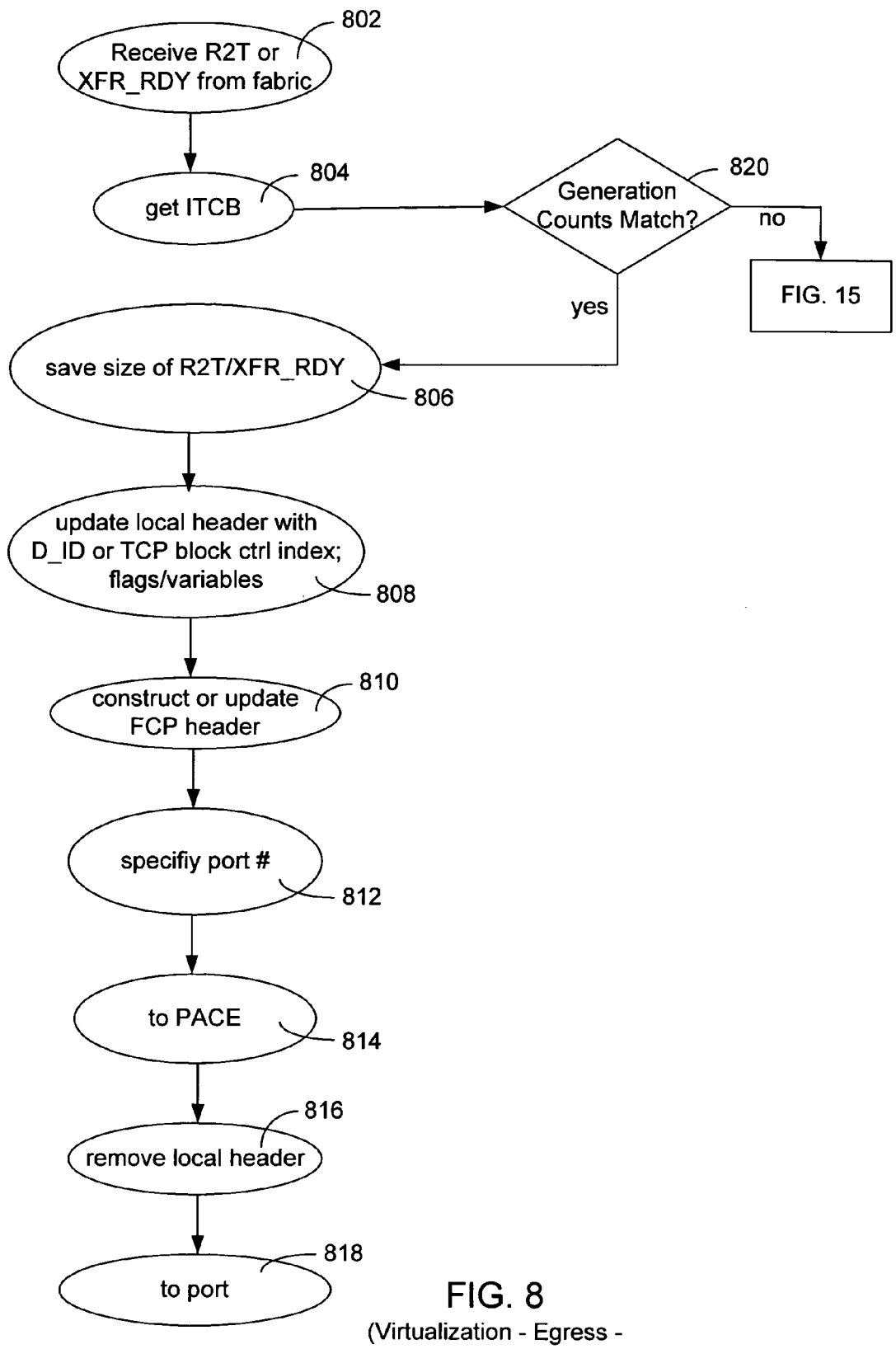
FIG. 8 is a flowchart illustrating a virtualization process in the egress direction for R2T or XFER_RDY packets or frames, in accordance with one embodiment.

Referring to FIG. 7, after a command has been sent to a target storage device as described above, and the command is a write command, an R2T PDU or an XFER_RDY IU will be received from a storage device when it is ready to accept write data, step 702. The PPU identifies the corresponding ETCB, step 704, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index), the Generation Count and the VTD ID from the ETCB, step 1061. The PPU also retrieves the FlowID from the PTD, which is also identified in the ETCB by the PTD ID. The FlowID indicates to the traffic manager the linecard of the original initiator (ingress) port. The FlowID, the VTD ID, the Task Index and the Generation Count are copied into the local header of the packet, step 1062. Finally the packet is sent to the traffic manager and the switch fabric, step 710.

R2T or XFER_RDY—Egress

After the R2T or XFER_RDY packet emerges from the switch fabric, it is received by a PPU associated with the ingress port, step 802, on its way to be passed back to the initiator (the device that initiated the original command for the particular task). The Task Index identifies the ITCB to the PPU, step 804, from which ITCB the original initiator_task_tag and the VTD ID can be obtained. The PPU then performs a comparison of the stored value of the Generation Count for the ITCB and the Generation Count value returned with the packet. If the Generation Counts are different, the steps shown in FIG. 15 and explained hereinafter are executed. Otherwise, the R2T/XFER_RDY Desired Data Transfer Length or BURST_LEN field is stored in the ITCB, step 806. The local header is updated with the FCP D_ID or the TCP Control Block Index for the TCP connection, step 808. Note that the stored S_ID from the original packet, which is stored in the ITCB, becomes the D_ID. If necessary, an FCP frame header is constructed or its fields are updated, step 810. The destination port number is specified in the local header in place of the FlowID, step 812, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, step 814, which identifies the outgoing port from the local header. The local header is then stripped, step 816 and forwarded to the proper port for transmission, step 818.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

Figure 9:
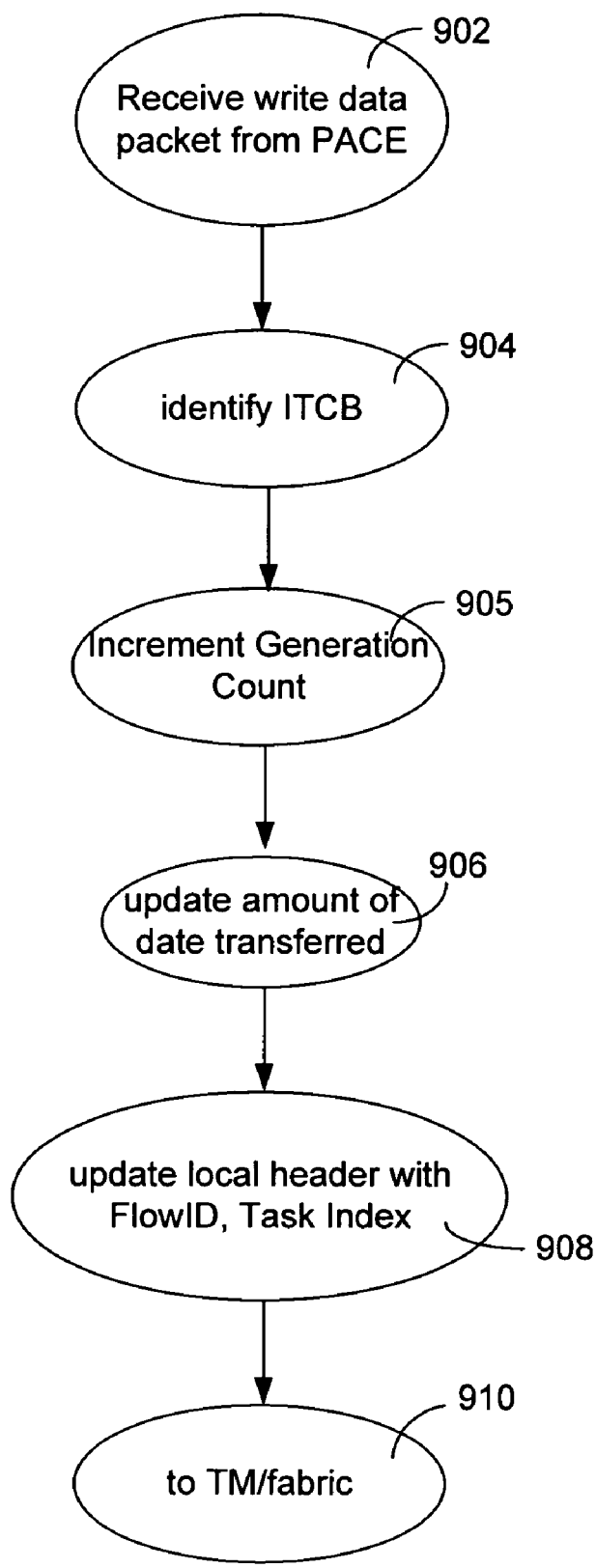
FIG. 9 is a flowchart illustrating a virtualization process in the ingress direction for write data packets or frames, in accordance with one embodiment.

After an initiator receives an R2T or XFER_RDY packet it returns a write-data packet. Referring to FIG. 9, when a write-data iSCSI PDU or FC IU is received from an initiator, step 902, the ITCB to which the packet belongs must be identified, step 904. Usually, the ITCB can be identified using the RX_ID or the target_task_tag, which is the same as the Task Index in some embodiments. Whether the Task Index is the same or different, the Generation Count for the identified ITCB is incremented, step 905. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 906. The FlowID, Task Index and Generation Count are added to the local header of the packet, step 908. The packet is then forwarded to the traffic manager and ultimately to the switch fabric, step 910.

Write Data Packet—Egress

Figure 10:
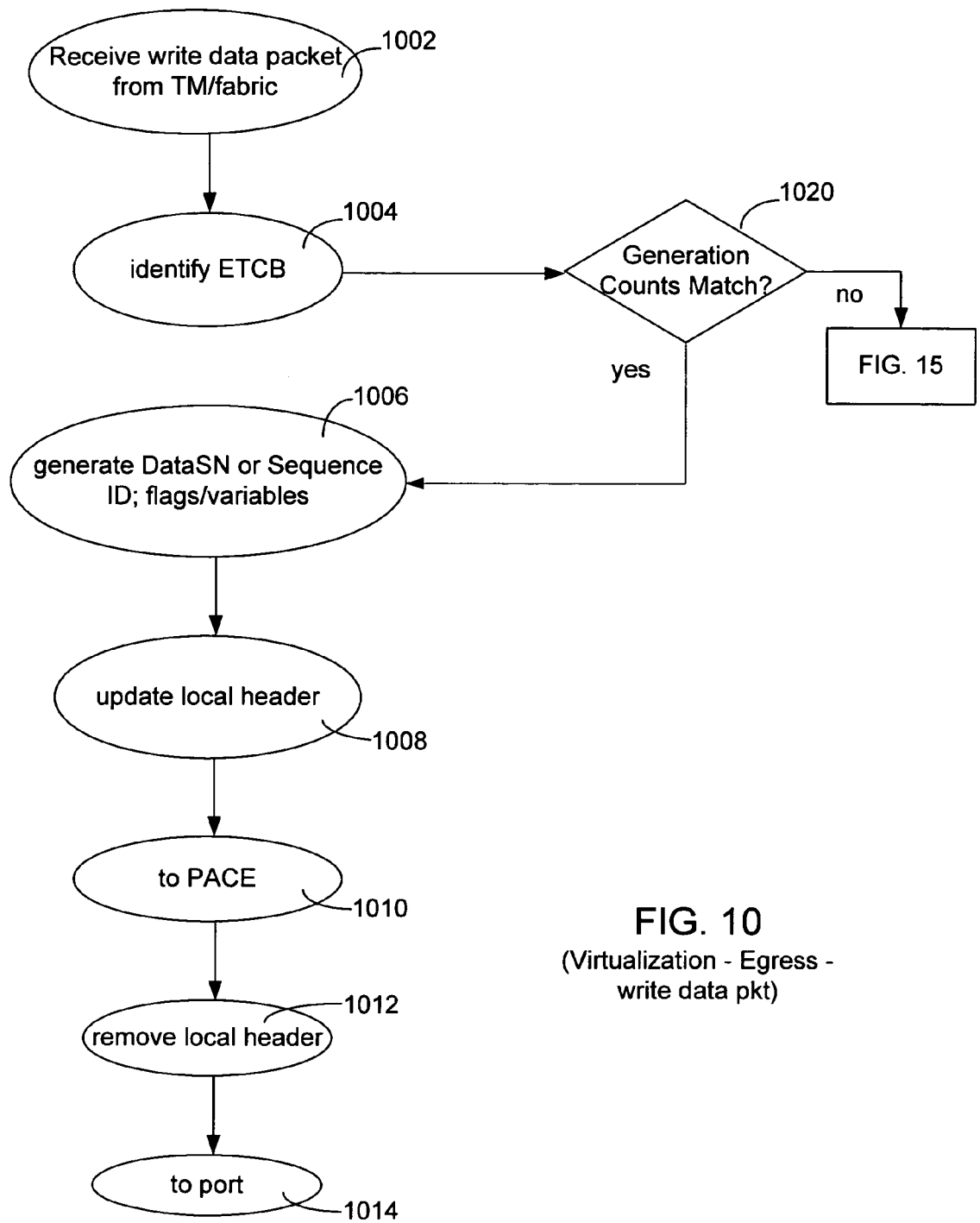
FIG. 10 is a flowchart illustrating a virtualization process in the egress direction for write data packets or frames, in accordance with one embodiment.

Referring to FIG. 10, when a write-data packet is received from the switch fabric (via the traffic manager), step 1002, the ETCB for the packet needs to be identified, step 1004. Typically, the ETCB can be identified by a combination of the local header Task Index and local header Source PPU address. Once the ETCB is found, a comparison of the sent Generation Count and Generation Count stored in the ETCB is performed, step 1020. If the Generation counts do not match, the frames that fail the generation count match are dropped. Otherwise, using the information inside the ETCB, the PPU generates proper iSCSI DataSN or FCP sequence ID, step 1006, along with any other flags and variables, e.g., data offset, for the PDU or FCP frame header. The local header is updated with the TCP Control Block Index or the FCP D_ID from the PTD, step 1008. The port number is also added to the local header. The finished iSCSI PDU or FCP frame is sent to the PACE, step 1010, which removes the local header, step 1012, and forwards the packet to the appropriate port, 1014.

Read Data Packet—Ingress

Figure 11:
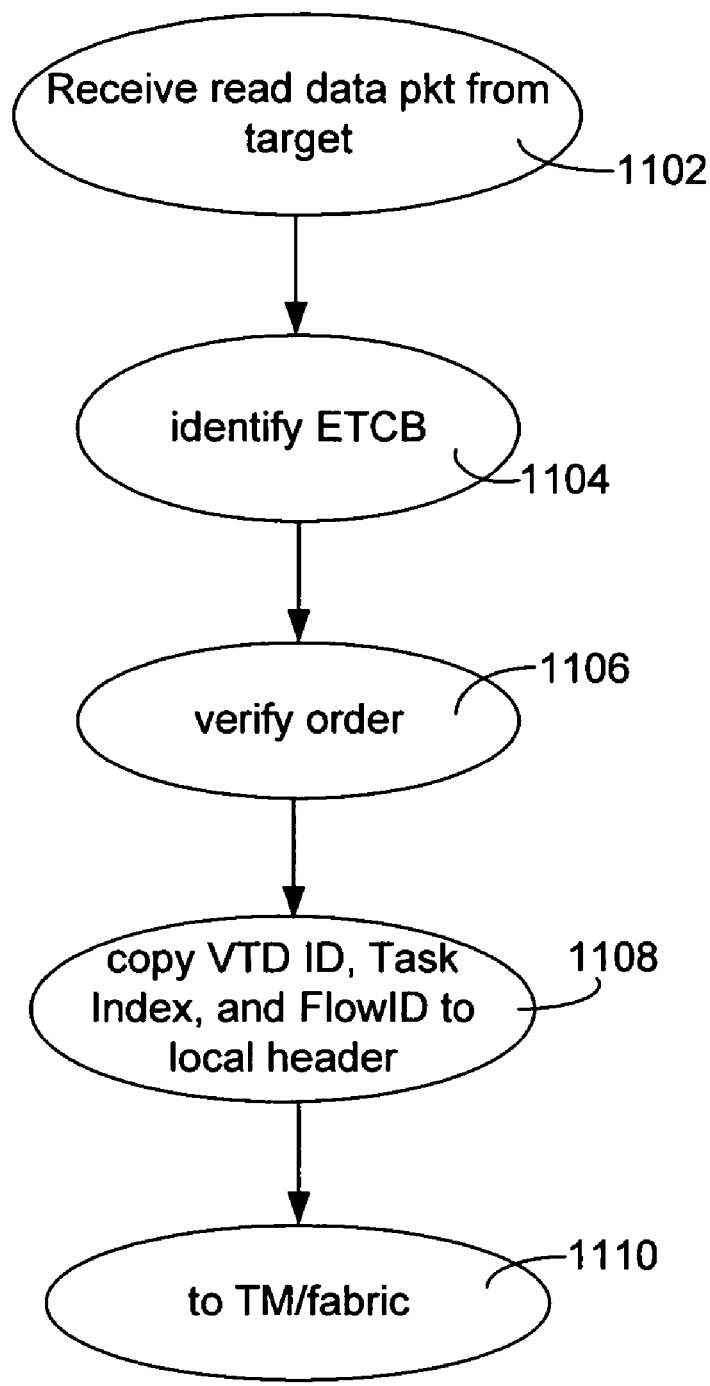
FIG. 11 is a flowchart illustrating a virtualization process in the ingress direction for read data packets or frames, in accordance with an embodiment of the invention.

Referring to FIG. 11, after receiving a read command, the target device will respond with a read-data packet, which will be received at the PPU (after undergoing classification in the PACE), step 1102. The ETCB for the packet is then identified, using the OX_ID or initiator_task_tag, step 1104. The PPU further verifies if the packet was received in order using sequence numbers or verifying that data offsets are in ascending order, step 1106. If the packet was not in order, the read command is terminated in error. If the packet is in proper order, however, the VTD ID, Task Index, FlowID and Generation Count are retrieved from the ETCB and VTD and copied into the local header, step 1108. The packet is sent to the traffic manager and ultimately the switch fabric, step 1110.

In the event that a read-data packet crosses an extent boundary, the data offset of the packet from the second extent must be modified. This offset is usually performed on the egress side, described below, as the FlowID will identify the packet from the second extent. In addition, in order to ensure sequentially returned data, the read command to the second extent will not be sent until completion of the read from the first extent.

Read Data Packet—Egress

Figure 12:
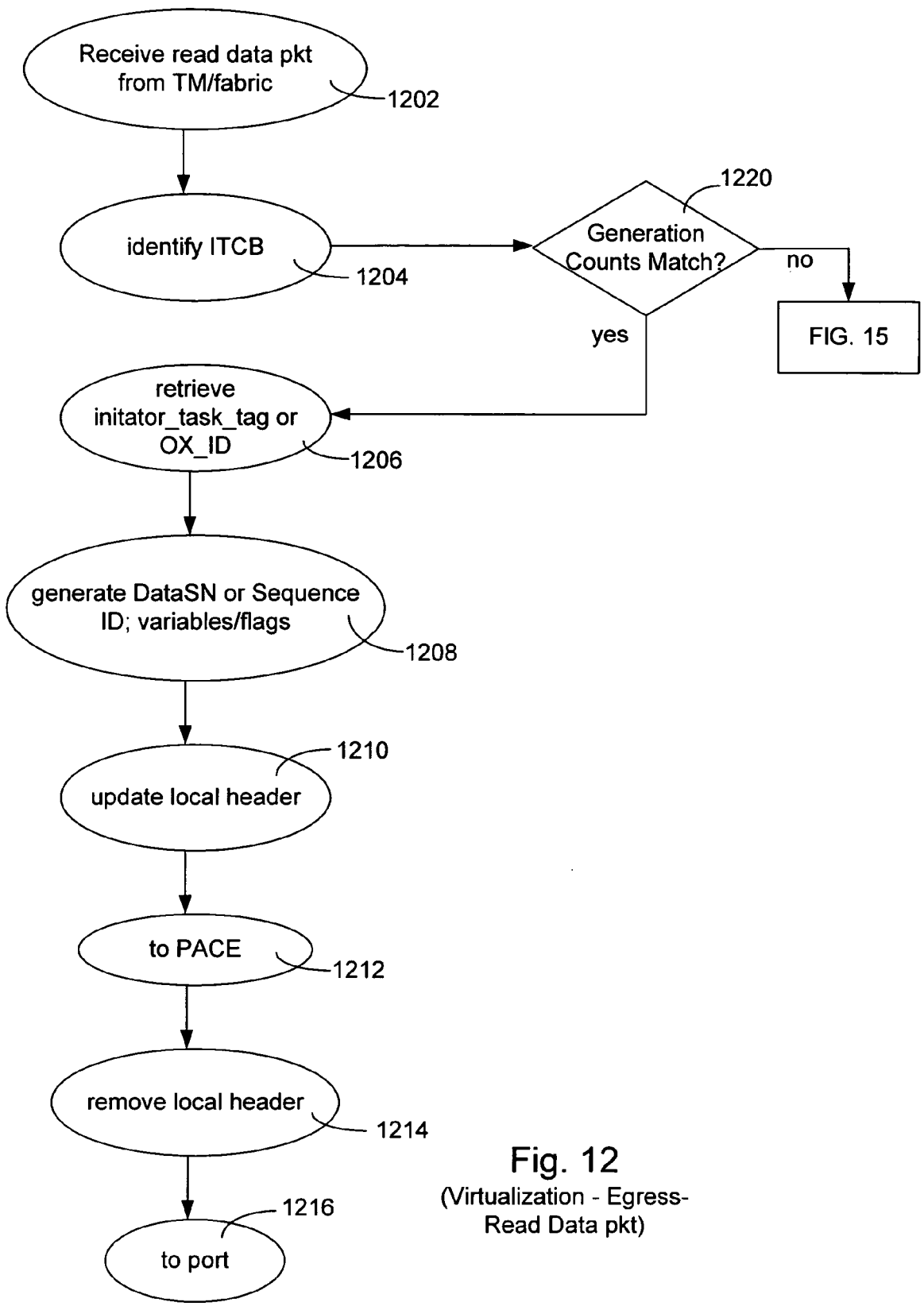
FIG. 12 is a flowchart illustrating a virtualization process in the egress direction for read data packets or frames, in accordance with an embodiment of the invention.

Referring to FIG. 12, when a read-data packet is received by a PPU from the switch fabric, step 1202, the ITCB for the packet is identified, step 1204, usually using the Task Index in the local header. The Generation Count stored in the ITCB is then compared against the Generation Count stored in the local header, step 1220. If the Generation counts do not match, the steps shown in FIG. 15 and explained hereinafter are executed. Otherwise, from the ITCB, the PPU retrieves the initiator_task_tag or OX_ID, step 1206. Using the saved data in the ITCB, the PPU generates proper iSCSI DataSN or FCP sequence IDs as well as other flags or variables of the PDU or FCP frame header, step 1208. The local header is updated with the TCP Control Block Index or FCP S_ID from the VTD, step 1210. Note, however, that for a packet going back to the initiator, the S_ID from the original packet will be used as the D_ID. The outgoing port number is also added to the local header. The packet is then sent to the PACE, step 1212, which removes the local header, step 1214, and forwards the packet to the appropriate port, step 1216.

In the event that a command is split between two extents (a fact tracked in the ITCB), the data offset of the packet from the second extent must be modified in a way similar to that described previously.

Response Packet—Ingress

Figure 13:
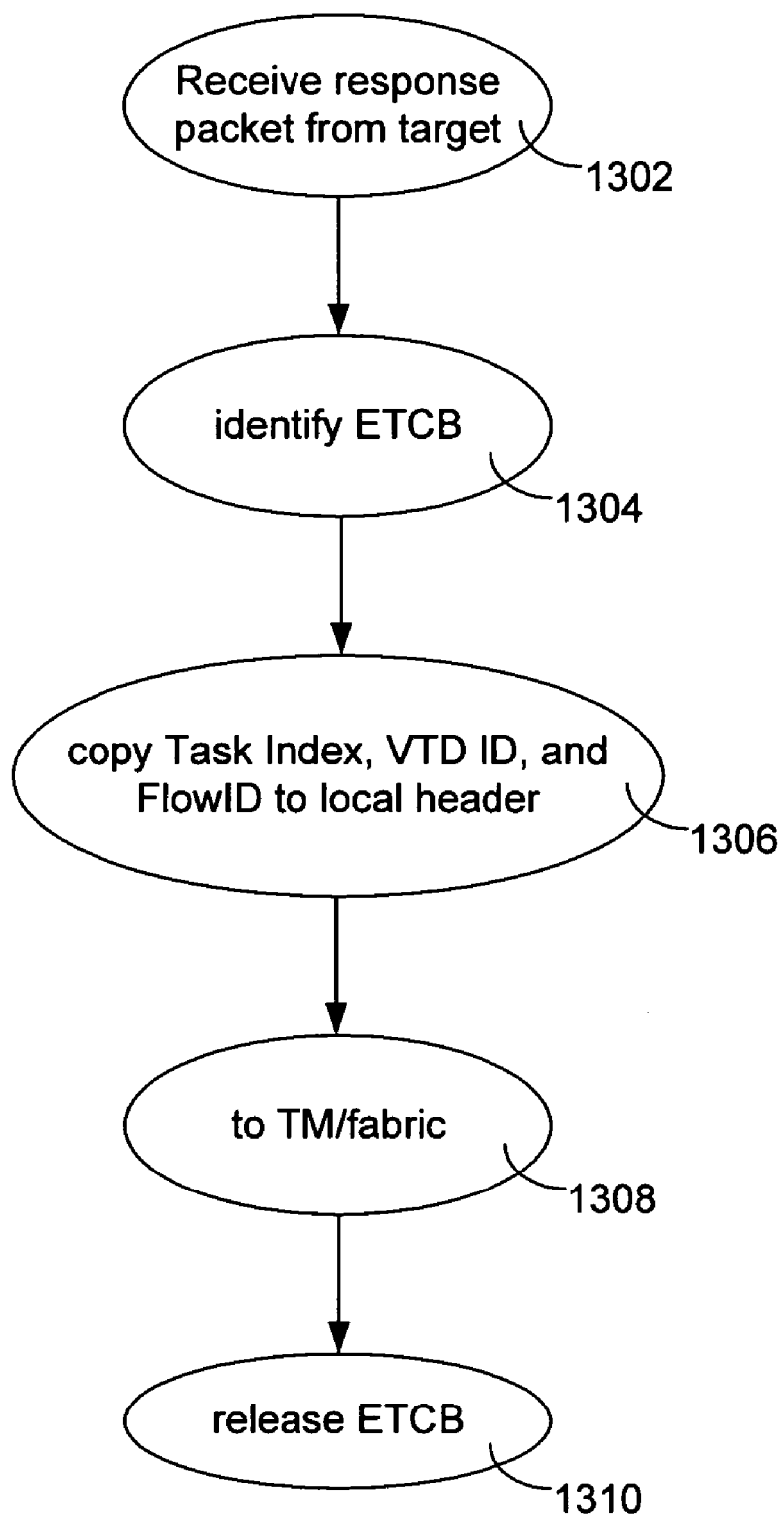
FIG. 13 is a flow chart illustrating a virtualization process in the ingress direction for response packets or frames, in accordance with an embodiment of the invention.

Referring to FIG. 13, a response packet will be received from a target device, step 1302. In general, response packets indicate the completion of a request. The ETCB for the packet is then identified, step 1304, using the initiator_task_tag or OX_ID of the packet. In some embodiments the initiator_task_jag or OX_ID will be the same as the Task Index. If the ETCB is not found, the packet is discarded. However, if the ETCB is found, then the Task Index and Generation Count are copied into the local header of the packet along with the VTD ID and the FlowID, step 1306. The packet is sent to the traffic manager and ultimately to the switch fabric, step 1308. Finally, because the verify packet signals the completion of a task, the ETCB for the task is released, step 1310.

Verify Packet—Egress

Figure 14:
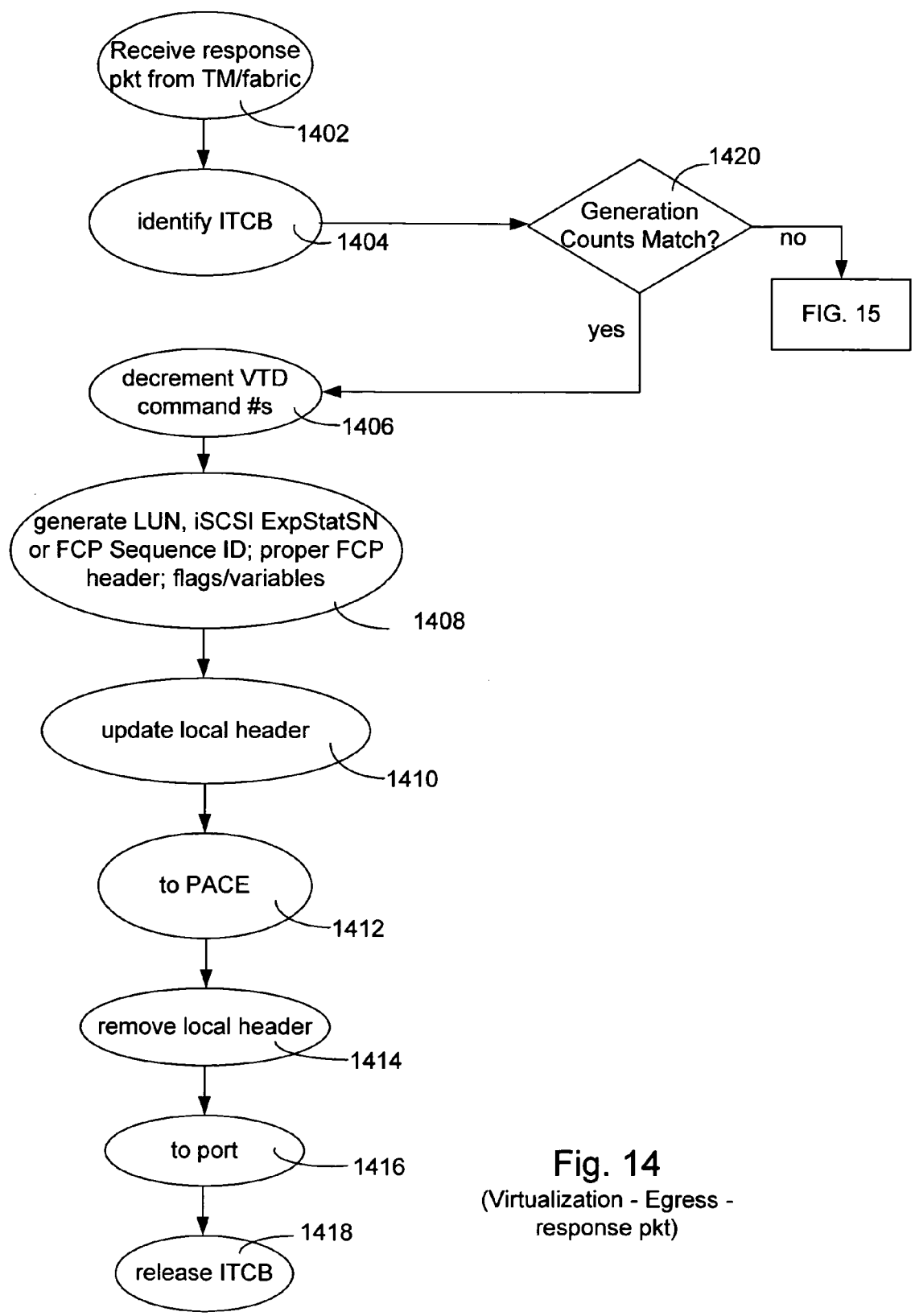
FIG. 14 is a flow diagram illustrating a virtualization process in the egress direction for response packets or frames, in accordance with an embodiment of the invention.

Referring to FIG. 14, after a verify packet has been through the switch fabric, it will be received by an egress PPU, step 1402. The ETCB stores this ITCB generation count in ETCB. When subsequent frames come from ITCB to ETCB, ETCB will match the generation count in the frame header and the generation count in ETCB. If they do not match, the frame is dropped. This prevents multiple logical ETCB with different generation counts on a single physical ETCB from being linked to the same ITCB. If the Counts match, the outstanding command count for the virtual target is decremented in the VTD, step 1406. The PPU generates the LUN, iSCSI ExpStatSN or FCP sequence ID from information in the ITCB and, if necessary, constructs or updates the proper FCP header, step 1408. The PPU also constructs other flags and variables for the PDU or FC frame header. The PPU updates the local header with the TCP Control Block Index or FCP S_ID (which becomes the D_ID) retrieved from the VTD, step 1410. The packet is forwarded to the PACE, step 1412, which removes the local header, step 1414, and forwards the packet to the appropriate port, step 1416. The PPU frees the ITCB, step 1418.

When a write command has been sent to more than one extent, a verify packet is not sent to the initiator until completion of the write to all extents.

Note that for all FIGS. 5-14, although the steps are described to occur in a particular order, in other embodiments, the order of some of the steps may be changed and some may be performed simultaneously.

PPU Task Synchronization

For each task discussed above (command, R2T/XFER_RDY, write, read, verify), in general, the PPU determines the type of packet and then performs either an ingress or an egress operation to communicate the task from the virtual target to a physical target or vice versa. If a task is completed successfully, the ITCB and the ETCB for that task are cleared. However, it may happen that a task is dropped or lost within the switch. This can potentially lead to an inconsistency between the PPUs for the respective ingress and egress ports for that task. The result would be a disruption in resource usage and allocation.

As indicated in the Background of the Invention section, it is therefore important that the ingress PPU remain consistent and in synchronization with the egress PPU(s) for a particular task. In order to accomplish this, as explained above, in embodiments of the present invention, each time a TCB and a Task Index are provisioned upon a request (e.g., write, read, verify), a Generation Count is also allocated. The Generation Count is incremented for every new task and allocation of a TCB, and the incremented value is stored in SRAM of the corresponding PPU.

A task may be initiated at an ingress port. After the ITCB is generated and the Task Index and Generation Count are allocated, the Task Index and Generation Count are written into the local header of the packet to be sent through the switch fabric to the indicated egress port(s). Once at the egress PPUs, an ETCB is created for the task, and the Task Index and Generation Count are written into memory of the egress PPUs corresponding to the egress ports. Examples of this include the sending of a read or write command as shown in FIGS. 5 and 6, the sending of a write data packet as shown in FIGS. 9 and 10, the sending of a read data packet as shown in FIGS. 11 and 12 and the sending of a verify packet as shown in FIGS. 13 and 14.

When a response is received from a target and routed through the egress PPU, the Generation Count stored in the ETCB associated with that response is written into the local header of the data packet, and the data packet is sent to the ingress PPU. Once at the ingress PPU, the ITCB for that data frame is identified from the local header of the frame and the stored Generation Count for that ITCB is compared against the Generation Count returned in the local header. If the Generation Counts are the same, processing of the data packet continues as described above.

Figure 15:
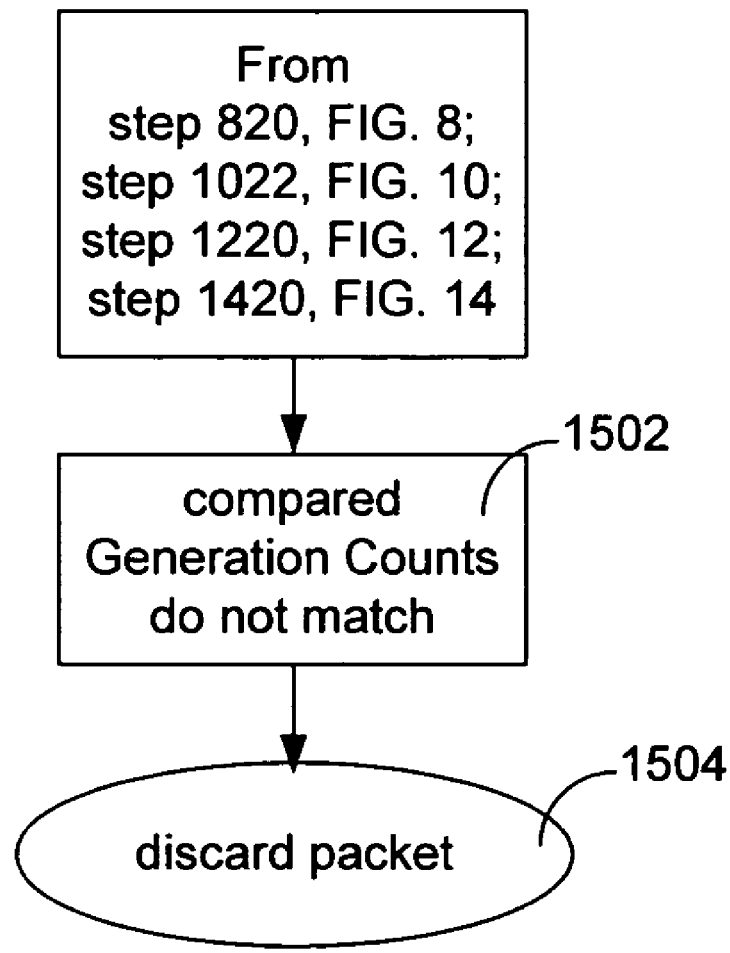
FIG. 15 is a flowchart illustrating a task synchronization process for use with virtualization processes shown in FIGS. 5-14.

However, referring now to FIG. 15, it may happen that a response coming back into the ingress PPU is for an expired or "stale" task. In particular, after some period of time, an ITCB is reused for a new request. In this case, the ITCB is freed and the Generation Count is incremented. Thus, if a stale data frame is returned to the ingress PPU, the corresponding ITCB will have a new Generation Count, and the comparison between the stored ITCB Generation Count and the returned local header Generation Count will indicate a mismatch. If a response comes back having a Generation Count that does not match the stored Generation Count, the received data frame discarded, step 1504. This prevents multiple logical ETCB with different generation counts on a single physical ETCB from being linked to the same ITCB. In the other direction, when ITCB receives a frame from ETCB, it need not do generation count matching. This is because the ITCB has a longer timeout than ETCB (explained hereinafter). This means that ITCB will always live longer than ETCB. Therefore, it is impossible that multiple logical ITCB with different generation counts on a single physical ITCB are accessed by the same ETCB.

As an example, a write request may be received at an ingress PPU. An ITCB is provisioned and an Task Index and Generation Count are provisioned. The request is then forwarded through the switch fabric to the egress PPU with the Task Index and Generation Count in the local header. Upon receipt of the write request, the egress PPU provisions an ETCB and writes the Task Index and Generation Count from the local header. If the resources are available, the egress PPU will return a transfer ready response to the ingress PPU with the Task Index and Generation Count from the ETCB stored in the local header. Upon receipt, the ITCB for that request is identified from the local header is identified and the stored and returned Generation Counts are compared. If matched, the write data may be sent to the targets via the egress PPUs with the Task Index and Generation Count in the local header. At the egress PPUs, the stored ETCB and local header Generation Counts are again compared. If matching, the data is written. A response having the Task Index and Generation Count in the local header may be sent to the ingress PPU. A final comparison is made. If matching, and the task is complete, the ITCB is freed for the next request. When a new request frame is then sent to the egress PPU, a new ETCB is created. At that time there is no comparison. The new Generation Count is stored in the new ETCB.

The Generation Count may have a range of 32 bits, so that, even with thousands of commands per second, the Generation Count of a TCB can increment without looping around so that it would improperly match a Generation Count associated with a stale response received back from the receiving PPU. Thus, stale responses from the receiving PPU are prevented from interfering with processing in the sending and receiving PPUs.

The above description in association with FIG. 15 assumes a sending PPU receives confirmation of a task from a receiving PPU, but that, due for example to a time lapse, the TCB for the sending PPU has freed its resources and the Generation Counts no longer match. However, it may happen that the sending PPU never receives any response or confirmation of a task from a receiving PPU at all. Therefore, in addition or as an alternative to the task synchronization steps described above with respect to FIG. 15, embodiments of the present invention may further employ timeouts to prevent previous instances of a stale task resource from disrupting the current use of the task resource. Such an embodiment is shown in FIG. 16.

Figure 16:
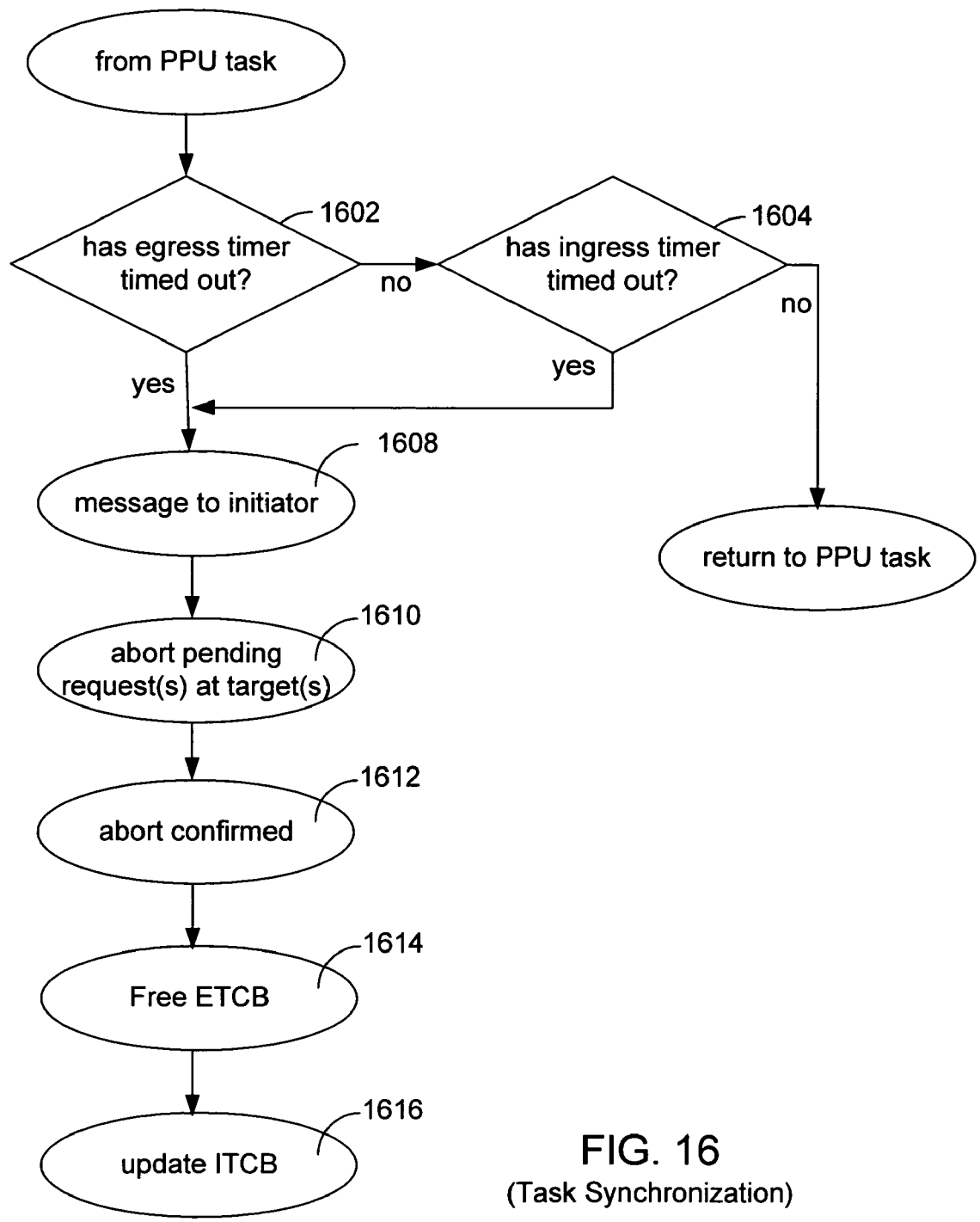
FIG. 16 is a flowchart illustrating a task synchronization process in accordance with an embodiment including a timeout period at the ingress and egress PPUs.

In accordance with one embodiment of the timeout sequence of FIG. 16, upon receiving a command at the ingress port and allocation of an ITCB, a timeout period countdown is implemented at the ingress port, for example at step 511 (FIG. 5) by clock 409 (FIG. 4). While this example relates to a write command and when the transfer ready response is received at the ingress PPU, it is understood that the timeout sequence may be used to set a period of time for a response or confirmation to any task at the ingress PPU. The purpose of the ingress PPU timeout period countdown is to detect whether the response or confirmation to the command is received at the ingress PPU within a predetermined period of time. For example, PPU $406_2$ may initiate a countdown in timer 409 when a command is received from an initiator at port $402_{2a}$.

Similarly, upon receipt of the command at the egress port and allocation of an ETCB, a second timeout countdown period may be implemented by a clock 409 of the egress PPU, for example at step 609 (FIG. 6). While this example relates to a write command and when the transfer ready response is received in the egress PPU, it is understood that the timeout sequence may be used to set a period of time for a response or confirmation to any task at the egress PPU. For example, PPU $406_3$ may initiate a countdown in a timer 409 when a command leaves port $402_{3a}$.

The storage switch can check the status of the commands provided to and returned from the physical targets via the ingress PPU and egress PPU to determine if all the appropriate responses have been returned within a predetermined amount of time after issuing the commands. In particular, at some point during the performance of its virtualization functions, both the ingress and egress PPUs sample their timers to determine if the timeout period countdown has expired, steps 1602 and 1604, respectively. Those of skill would appreciate that the point during the virtualization processing at which the timers are sampled may vary in alternative embodiments. If neither of the timers has expired, the PPUs continue their virtualization processing. If on the other hand, one of the timers has elapsed in steps 1602 or 1604, then a message is sent to the initiator regarding the timeout, step 1608, and an abort command may be sent to abort the pending request, step 1610, as well as other steps explained hereinafter.

Various timeout periods at the ingress and egress PPUs may be appropriate and used in individual implementations depending upon various design considerations. For example, different physical targets and different configurations for a network can lead to different times in which a target can be expected to return a resource if the there is no deadlock. Additionally, the traffic being handled by an individual target at any given time can effect a target's time to return a resource. A timeout period can be chosen given these considerations as well as others. In one exemplary embodiment, a timeout period of 25 seconds may be used at the egress PPU and a timeout period of 30 seconds may be used at the ingress PPU. It is understood that time periods of less or more than 25 and 30 seconds can be used, however, in embodiments of the present invention, the timeout period of the egress PPU is preferably less than the timeout period of the ingress PPU to prevent the ingress PPU from prematurely aborting a command before the egress PPU has time to generate the response. Additionally, in embodiments of the present invention, both the egress and ingress PPU timeout periods are less than the timeout period for the initiator. Initiator timeouts take longer to resolve and it is preferable that timeouts be handled by the PPUs.

A timeout in either the ingress PPU or the egress PPU may occur in a number of scenarios. In one embodiment, a command is sent by the ingress PPU but the transfer ready response is never received back in the egress PPU. This may occur for example if a physical storage device is off-line or otherwise unable to allocate resources. In this embodiment, the egress PPU timer will decrement to zero and timeout. As previously indicated, a single command from the ingress PPU may invoke several physical devices and their corresponding egress PPUs. In this instance, if any of the physical devices fails to return the transfer ready response, its corresponding egress PPU will timeout and an abort command is generated as explained hereinafter. If the egress PPU timer expires, the task will time out at the egress port, prompting the release of the transfer ready resource if it is marked resource allocated. In this manner, new request messages received at the egress port for the same resource will be able to acquire the resource.

The ingress PPU timer preferably has a longer period of time before timing out than the egress PPU so that the ingress PPU does not timeout before the egress PPU has enough time to determine whether the ready response was received back from the respective physical devices. In the event of a timeout, any resources that have been allocated may be released.

If either the ingress or egress PPU timer times out in accordance with a scenario described above, the ingress PPU generates a message to the initiator in step 1608 informing of the timeout so that the initiator may resend the request. Additionally, to the extent multiple egress PPUs were involved in responding with a resource, an abort command is sent to abort the pending request at each physical target, step 1610. In one embodiment, an abort command is first issued from the ingress port (e.g., $402_{1a}$) to the egress port(s) (e.g., $402_{3a}$ and $402_{4a}$) connected to the physical targets of the virtual target. A PPU associated with the ingress port can provide the abort command to the PPUs of the egress ports connected with the physical targets. At the egress port(s), the status of the command can be updated, such as by updating the status of an ETCB allocated for the pending request at each egress port. The status can be updated to indicate that the command has been aborted. After receiving an abort command, the physical targets will clear the request and free any allocated resources. The physical targets may then return responses confirming acceptance of the abort command to the egress ports, step 1612. The egress ports receive the responses and clear the state of the command at the port, step 1614. For example, PPU $406_3$ of egress port $402_{3a}$ can free an ETCB allocated and stored in SRAM $405_3$. The egress ports each then return a response to the ingress port where the state of the ITCB for the command is updated so that the command will be retried, step 1616.

If a PPU associated with the egress ports timely receives a response, a frame or a data packet, then the egress PPU timer is reset. Similarly, if a PPU associated with in the ingress port receives either a response, frame or a data packet, then the ingress PPU timer is reset. Thus, the timers will not prematurely timeout a command that is being processed normally.

In embodiments of the invention where the ITCB timeout is set greater than the ETCB timeout, this guarantees that a stale transfer ready or response frame from the ETCB in Egress PPU will not be sent to the Ingress PPU (because it would have timed out). This makes the Ingress PPU Generation Count checking optional and it can be eliminated to improve performance. Generation Count checking is done in the egress PPU for data frames.

In an alternative embodiment having full ingress and egress Generation Count checking, the ITCB and ETCB timeouts are set to the same value. There is a possibility stale transfer ready or response frames can be sent to the ingress PPU. The ingress PPU therefore performs Generation Count checking for transfer ready and response frames sent by the egress PPU to the ingress PPU. Generation Count checking is done in the egress PPU for Data frames.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A method of maintaining task synchronization between first and second processors within a switch of a network, comprising the steps of:
   (a) provisioning information upon receipt of a data unit at a first time to be routed through the first and second processors, the information uniquely identifying the data unit;
   (b) provisioning a count uniquely identifying the data unit at said first time, the count capable of incrementing to identify other data units;

(c) associating said identifier and count with a response to a task generated at a second time; and
(d) using the information and a second count associated with said response to maintain a synchronized state between the first and second processors performing a processing task on said data unit.

2. A method of maintaining task synchronization between first and second processors as recited in claim 1, wherein the information comprises an identifier and a count.

3. A method of maintaining task synchronization between first and second processors as recited in claim 1, wherein the task relates to performing one of a read operation, a write operation or a verify operation.

4. A method of maintaining task synchronization between first and second processors as recited in claim 1, further comprising the steps of:
(c) provisioning a timeout period within at least one of the first and second processors; and
(d) using the timeout period to maintain a synchronized state between the first and second processors.

5. A method of maintaining task synchronization between first and second processors as recited in claim 1, wherein the data unit is in a Fiber Channel IU.

6. A method of maintaining task synchronization between first and second processors as recited in claim 1, wherein the data unit is in an iSCSI PDU.

7. A method of maintaining task synchronization between first and second processors as recited in claim 1, wherein said step (b) of using the information to maintain a synchronized state between the first and second processors comprises the steps of:
(c) storing the information in memory associated with the first processor;
(d) sending the data unit with the information from the first processor to the second processor, the first processor capable of altering the information stored in memory upon receipt of a new data unit thereafter;
(e) returning a response relating to the data unit from the second processor to the first processor, the response including returned information;
(f) comparing the returned information with the information stored in memory; and
(g) discarding the response if the returned information and stored information are different.

8. A method of maintaining task synchronization between processors within a switch of a network, comprising the steps of:
(a) generating and maintaining within said switch information uniquely representing a task upon receipt of the task at a time $t_1$, the information capable of changing upon receipt of subsequent tasks;
(b) generating at said time $t_1$ a count further identifying said task, said count being capable of incrementing thereafter to identify other tasks;
(c) associating the information and the count generated at said time $t_1$ with other information and another count in a response to the task at a time $t_2$ after time $t_1$; and
(d) comparing the other information and other count in said response with the information and count generated at said time $t_1$ to maintain task synchronization.

9. A method of maintaining task synchronization within a switch of a network as recited in claim 8, further comprising a step (d) of discarding the response generated in said step (b) if the other information generated in said step (b) is different than the information generated and maintained in said step (a).

10. A method of maintaining task synchronization within a switch of a network as recited in claim 8, wherein the unique information comprises an identifier.

11. A method of maintaining task synchronization between first and second processors within a switch of a network, comprising the steps of:
(a) generating a first count upon receipt by the first processor of a task from an initiator at a time $t_1$, the first count uniquely identifying the task and being capable of incrementing thereafter for another task;
(b) generating a first identifier at time $t_1$ further identifying the task; and
(c) comparing the first count and the first identifier with a second count and a second identifier associated with a response generated by a target in response to the task at a time $t_2$ after the time $t_1$ to maintain task synchronization before processing the response by the second processor.

12. A method of maintaining task synchronization between first and second processors as recited in claim 11, the task comprising one of performing a read operation, a write operation or a verify operation.

13. A method of maintaining task synchronization between first and second processors as recited in claim 11, wherein the task is communicated in one of iSCSI or Fibre Channel protocols.

14. A method of maintaining task synchronization between first and second processors as recited in claim 11, wherein the first processor is in communication with an initiator.

15. A method of maintaining task synchronization between first and second processors as recited in claim 14, wherein the initiator is a server.

16. A method of maintaining task synchronization between first and second processors as recited in claim 11, wherein the second processor is in communication with a target.

17. A method of maintaining task synchronization between first and second processors as recited in claim 16, wherein the target is one or more physical storage devices.

18. A method of maintaining task synchronization between first and second processors as recited in claim 11, wherein the task relates to the processing of a data unit routed between the first and second processors through the fabric of the switch.

19. A method of maintaining task synchronization between first and second processors within a switch of a network, the first and second processors capable of routing a data unit between an initiator of the data unit and a target for the data unit, the method comprising the steps of:
(a) provisioning an identifier identifying the data unit at a time $t_1$;
(b) provisioning a count further identifying the data unit at the time $t_1$, the count capable of incrementing thereafter to identify other data units, said identifier and count uniquely identifying the data unit;
(c) storing the identifier and count provisioned at time $t_1$ in said steps (a) and (b);
(d) associating the identifier and the count provisioned at time $t_1$ in said steps (a) and (b) with a response generated within the second processor in response to the task at time $t_2$ after the time $t_1$; and
(e) comparing another count associated with the response in said step (d) with the count stored in said step (c) to maintain task synchronization.

20. A method of maintaining task synchronization between first and second processors as recited in claim 19, the task comprising one of performing a read operation, a write operation or a verify operation.

21. A method of maintaining task synchronization between first and second processors as recited in claim 19, wherein the task is communicated in one of iSCSI or Fibre Channel protocols.

22. A method of maintaining task synchronization between first and second processors as recited in claim 19, further comprising the step of discarding the response generated in said step (d) if the other count associated with the response in said step (d) is not the same as the count stored in said step (c).

23. A method of maintaining task synchronization between first and second processors as recited in claim 19, further comprising the step of releasing any resources allocated for the response generated in said step (d) if the other count associated with the response in said step (d) is not the same as the count stored in said step (c).

24. A method of maintaining task synchronization between first and second processors as recited in claim 19, further comprising the step of informing the initiator of the result if the other count associated with the response in said step (d) is not the same as the count stored in said step (c).

25. A system of maintaining task synchronization between first and second processors within a switch of a network, the system comprising:
   means for provisioning information upon receipt of a data unit at a first time to be routed through the first and second processors, the information uniquely identifying the data unit;
   means for provisioning a count further identifying the data unit at said first time, the count capable of incrementing thereafter to identify other data units;
   means for associating said identifier and said count with a response to a task generated within the second processor at a second time; and
   means for using the information and the count associated with said response to maintain a synchronized state between the first and second processors.

26. A system of maintaining task synchronization between first and second processors as recited in claim 25, wherein the information comprises an identifier.

27. A system of maintaining task synchronization between first and second processors as recited in claim 25, wherein the data unit relates to performing a read operation, a write operation or a verify operation.

28. A system of maintaining task synchronization between first and second processors as recited in claim 25, further comprising:
   means for provisioning a timeout period within at least one of the first and second processors; and
   means for using the timeout period to maintain a synchronized state between the first and second processors.

29. A system of maintaining task synchronization between first and second processors as recited in claim 25, wherein the data unit is in a Fiber Channel IU.

30. A system of maintaining task synchronization between first and second processors as recited in claim 25, wherein the data unit is in an iSCSI PDU.

31. A system of maintaining task synchronization between first and second processors as recited in claim 25, said means of using the information to maintain a synchronized state between the first and second processors comprising:
   a memory associated with the first processor for storing the information;
   the first processor sending the data unit with the information to the second processor, the first processor capable of altering the stored information upon receipt of a new data unit thereafter;
   the first processor comparing returned information in a response by the second processor to the data unit with the information stored in said memory and
   discarding the response if the returned information and stored information are different.

* * * * *